(12) United States Patent
Vidrighin et al.

(10) Patent No.: US 12,554,174 B2
(45) Date of Patent: Feb. 17, 2026

(54) OPTICAL SWITCHES BASED ON INDUCED OPTICAL LOSS

(71) Applicant: PsiQuantum Corp., Palo Alto, CA (US)

(72) Inventors: Mihai Vidrighin, Palo Alto, CA (US); Nikhil Kumar, Burlingame, CA (US); Gary Gibson, Palo Alto, CA (US)

(73) Assignee: PsiQuantum Corp., Palo Alto, CA (US)

( * ) Notice: Subject to any disclaimer, the term of this patent is extended or adjusted under 35 U.S.C. 154(b) by 0 days.

(21) Appl. No.: 18/763,346

(22) Filed: Jul. 3, 2024

(65) Prior Publication Data

US 2024/0361663 A1 Oct. 31, 2024

Related U.S. Application Data

(60) Continuation of application No. 18/378,572, filed on Oct. 10, 2023, now abandoned, which is a
(Continued)

(51) Int. Cl.
*G02F 1/313* (2006.01)
*G02B 6/12* (2006.01)
*G02B 6/35* (2006.01)

(52) U.S. Cl.
CPC ....... *G02F 1/3138* (2013.01); *G02B 6/12007* (2013.01); *G02B 6/354* (2013.01);
(Continued)

(58) Field of Classification Search
CPC ................ G02B 6/12007; G02B 6/354; G02B 2006/12145; G02B 2006/12147; G02F 1/3138
See application file for complete search history.

(56) References Cited

U.S. PATENT DOCUMENTS

| | | |
|---|---|---|
| 4,291,939 A | 9/1981 | Giallorenzi et al. |
| 5,202,941 A | 4/1993 | Granestrand |

(Continued)

OTHER PUBLICATIONS

Vidrighin et al., Notice of Allowance, U.S. Appl. No. 16/503,993, Apr. 8, 2020, 13 pgs.
(Continued)

*Primary Examiner* — Daniel Petkovsek
(74) *Attorney, Agent, or Firm* — Morgan, Lewis & Bockius LLP

(57) ABSTRACT

A method includes propagating light in a first waveguide of a 1×2 optical switch. The first waveguide is adjacent to a second waveguide in a coupling region. The 1×2 optical switch comprising an input to receive the light and couple the light to the first waveguide. The 1×2 optical switch further comprising a first output to output light from the first waveguide and a second output to output the light from the second waveguide. The method further includes coupling the light to the first output and the second output based on absorption values of the second waveguide in the coupling region; adjusting absorption values of the second waveguide in the coupling region such that light is directed from the input to only the first output; and coupling light to only the first output based on the adjusted absorption values of the second waveguide in the coupling region.

11 Claims, 21 Drawing Sheets

Related U.S. Application Data continuation of application No. 17/728,890, filed on Apr. 25, 2022, now Pat. No. 11,782,323, which is a continuation of application No. 16/941,355, filed on Jul. 28, 2020, now Pat. No. 11,314,143, which is a division of application No. 16/503,993, filed on Jul. 5, 2019, now Pat. No. 10,747,085.

(52) U.S. Cl.
CPC .. *G02F 1/3132* (2013.01); *G02B 2006/12145* (2013.01); *G02B 2006/12147* (2013.01)

(56) References Cited

U.S. PATENT DOCUMENTS

| | | | |
|---|---|---|---|
| 5,375,180 | A | 12/1994 | Murphy |
| 5,878,181 | A | 3/1999 | Van Der Tol |
| 6,055,342 | A | 4/2000 | Yi et al. |
| 6,310,999 | B1 | 10/2001 | Marcuse et al. |
| 6,470,125 | B1 | 10/2002 | Nashimoto et al. |
| 6,633,692 | B2 | 10/2003 | Chua et al. |
| 7,860,358 | B2 | 12/2010 | Tsuda et al. |
| 7,941,014 | B1 | 5/2011 | Watts et al. |
| 10,747,085 | B1 | 8/2020 | Vidrighin et al. |
| 11,314,143 | B2 | 4/2022 | Vidrighin et al. |
| 11,782,323 | B2 | 10/2023 | Vidrighin et al. |
| 2002/0085788 | A1 | 7/2002 | Ramalingam et al. |
| 2004/0126072 | A1 | 7/2004 | Lee et al. |
| 2005/0147339 | A1* | 7/2005 | Prather ............... G02F 1/3132 385/9 |
| 2006/0039647 | A1 | 2/2006 | Ling et al. |
| 2011/0305456 | A1* | 12/2011 | Sharkawy ............ B82Y 20/00 398/45 |
| 2017/0255079 | A1* | 9/2017 | Jiang ................... G02F 1/3138 |
| 2022/0163729 | A1* | 5/2022 | Mazed ................. G02F 1/3134 |
| 2024/0302708 | A1 | 9/2024 | Vidrighin et al. |

OTHER PUBLICATIONS

Vidrighin et al., Non-Final Office Action, U.S. Appl. No. 16/941,355, Sep. 21, 2021, 13 pgs.

Vidrighin et al., Notice of Allowance, U.S. Appl. No. 16/941,355, Dec. 22, 2021, 10 pgs.

Soref, Guided-Wave Intensity Modulators Using Amplitude-and-Phase Perturbations, Journal of the Lightwave Technology, vol. 6, No. 3, Mar. 1988, 8 pgs.

Soref, Mid-Infrared 2 × 2 Electro-Optical Switching by Silicon and Germanium Three-Waveguide and Four-Waveguide Directional Couplers Using Free-Carrier Injection, Photon. Res. / vol. 2, No. 5, Oct. 2014, 9 pgs.

Sacher, Monolithically Integrated Multilayer Silicon Nitride-on-Silicon Waveguide Platforms for 3-D Photonic Circuits and Devices, Invited Paper, Proceedings of the IEEE, vol. 106, No. 12, Dec. 2018, 14 pgs.

Vidrighin et al., Non-Final Office Action, U.S. Appl. No. 17/728,890, Feb. 14, 2023, 15 pgs.

Vidrighin et al., Notice of Allowance, U.S. Appl. No. 17/728,890, Jul. 6, 2023, 9 pgs.

Vidrighin et al., Non-Final Office Action, U.S. Appl. No. 18/378,572, Jun. 26, 2024, 12 pgs.

* cited by examiner

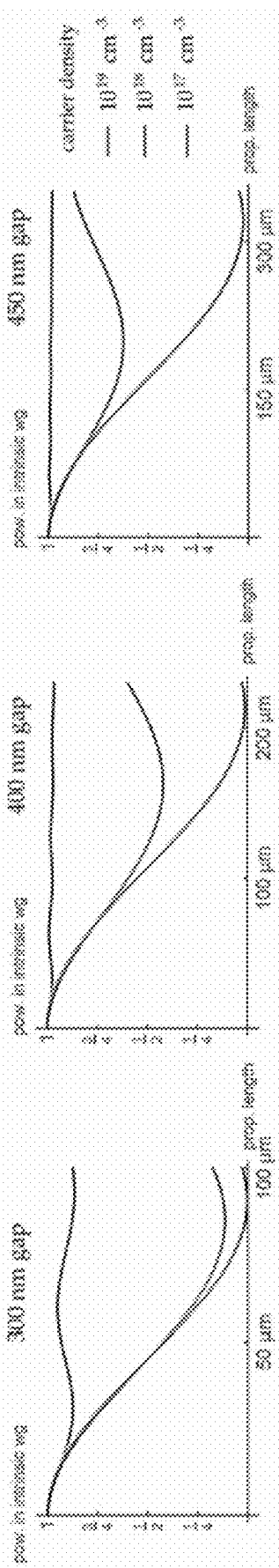
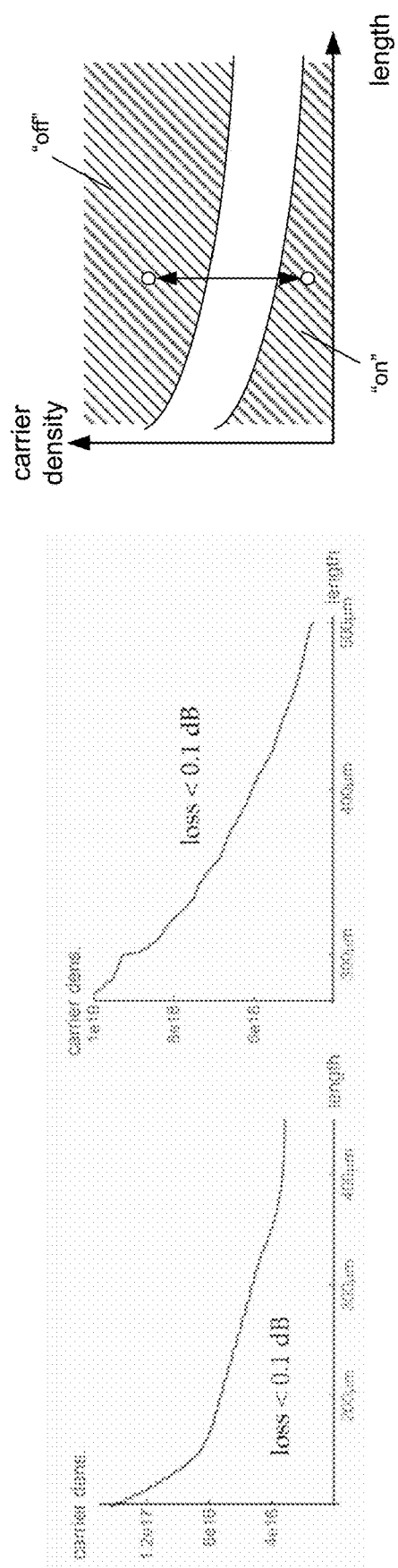
Figure 1F
Figure 1G

900

902 Transmit light into a first semiconductor structure of an optical switch device while a first voltage satisfying a first voltage condition is applied between a first doped region and a second doped region for coupling the light from a first waveguide to a second waveguide 904 Transmit the light into the first semiconductor structure while a second voltage satisfying a second voltage condition is applied between the first doped region and the second doped region for propagating the light within the first waveguide without coupling the light from the first waveguide to the second waveguide 906 The second semiconductor structure has a first carrier density while the first voltage is applied between the first doped region and the second doped region. The second semiconductor structure has a second carrier density that is greater than the first carrier density by a factor of at least 100 while the second voltage is applied between the first doped region and the second doped region.

908 The light is coupled from the first waveguide to the second waveguide while the optical switch device is at a temperature between 40 Kelvin and 200 Kelvin 910 Applying the second voltage between the first doped region and the second doped region while the optical switch device is at a temperature less than 40 Kelvin allows coupling of the light from the first waveguide to the second waveguide

Figure 9

OPTICAL SWITCHES BASED ON INDUCED OPTICAL LOSS

RELATED APPLICATION

This application is a continuation of U.S. patent application Ser. No. 18/378,572, filed Oct. 10, 2023, now abandoned, which is a continuation of U.S. patent application Ser. No. 17/728,890, filed Apr. 25, 2022, now U.S. Pat. No. 11,782,323, which is a continuation of U.S. patent application Ser. No. 16/941,355, entitled "Optical Switches Based on Induced Optical Loss," filed Jul. 28, 2020, now U.S. Pat. No. 11,314,143, which is a divisional application of U.S. patent application Ser. No. 16/503,993 entitled "Optical Switches Based on Induced Optical Loss," filed Jul. 5, 2019, now U.S. Pat. No. 10,747,085, which are hereby incorporated by reference in their entirety.

TECHNICAL FIELD

This relates generally to photonic devices and, more specifically, to optical switch devices.

BACKGROUND

Optical switch devices are used in various optical applications, such as optical communications. High speed optical switch devices often include phase shifters. In such optical switch devices, phase shifts (by electro-optic effects or magneto-optic effects) in one or more optical waveguides are adjusted to output different portions of input light from the optical waveguides. However, such optical switch devices require careful tuning of the phase shifts to achieve high contrast between on and off states.

SUMMARY

In accordance with some embodiments, an optical switch device includes a first semiconductor structure configured to operate as a first waveguide; and a second semiconductor structure configured to operate as a second waveguide. The second semiconductor structure is located above or below the first semiconductor structure and separated from the first semiconductor structure. The second semiconductor structure includes a first portion having a first width and a second portion having a width different from the first width and located on the first portion. The first portion is located between a first doped region and a second doped region.

In some embodiments, the first semiconductor structure and the second semiconductor structure are configured to couple light propagating in the first waveguide to the second waveguide while a first voltage satisfying a first voltage condition is applied between the first doped region and the second doped region. The first semiconductor structure and the second semiconductor structure are configured to forego coupling of the light propagating in the first waveguide to the second waveguide while a second voltage satisfying a second voltage condition is applied between the first doped region and the second doped region.

In some embodiments, the second semiconductor structure has a first carrier density while the first voltage is applied between the first doped region and the second doped region. The second semiconductor structure has a second carrier density that is greater than the first carrier density by a factor of at least 100 while the second voltage is applied between the first doped region and the second doped region.

In some embodiments, the first portion has a first absorption property while the first voltage is applied between the first doped region and the second doped region and a second absorption property that is different from the first absorption property while the second voltage is applied between the first doped region and the second doped region.

In some embodiments, the second portion includes a plurality of first sections having a second width interleaved by a plurality of second sections having a third width different from the second width.

In some embodiments, the second portion includes a plurality of first sections having a first thickness interleaved by a plurality of second sections having a second thickness different from the first thickness.

In some embodiments, each first section of the plurality of first sections has a first length; and each second section of the plurality of second sections has a second length that is different from the first length.

In some embodiments, the first semiconductor structure is made of a first semiconductor material having a first index of refraction; and the second semiconductor structure is made of a second semiconductor material having a second index of refraction that is different from the first index of refraction.

In some embodiments, the first doped region is doped with donor dopants, and the second doped region is doped with acceptor dopants.

In some embodiments, one of the first waveguide and the second waveguide is connected to an input port of the optical switch device for receiving light. The first waveguide is connected to a first output port of the optical switch device. The second waveguide is connected to a second output port of the optical switch device that is different from the first output port of the optical switch device.

In accordance with some embodiments, an optical switch device includes a first semiconductor structure configured to operate as a first waveguide and a second semiconductor structure configured to operate as a second waveguide. The second semiconductor structure is located above or below the first semiconductor structure and separated from the first semiconductor structure. The second semiconductor structure includes a portion of a first doped region doped with dopants of a first type and a portion of a second doped region doped with dopants of a second type that is different from the dopants of the first type.

In some embodiments, the second semiconductor structure includes a plurality of first-cross-section regions interleaved by a plurality of second-cross-section regions along the direction of the second waveguide.

In some embodiments, each first-cross-section region of the plurality of first-cross-section regions has a first width, and each second-cross-section region of the plurality of second-cross-section regions has a second width that is different from the first width.

In some embodiments, each first-cross-section region of the plurality of first-cross-section regions has a first thickness, and each second-cross-section region of the plurality of second-cross-section regions has a second thickness that is different from the first thickness.

In some embodiments, the plurality of first-cross-section regions includes first, second, and third regions and the plurality of second-cross-section regions includes fourth and fifth regions. The first, second, and third regions are interleaved by the fourth and fifth regions so that the fourth region is located between the first and second regions and the fifth region is located between the second and third regions. The optical switch device also includes (i) a plurality of regions doped with the dopants of the first type, including the first doped region and a third doped region, and (ii) a plurality of regions doped with the dopants of the second type, including the second doped region and a fourth doped region. The first doped region and the second doped region include the first, fourth, and second regions. The third doped region and the fourth doped region include the second, fifth, and third regions.

In some embodiments, the plurality of first-cross-section regions includes a sixth region and the plurality of second-cross-section regions includes a seventh region, the seventh region being located between the third region and the sixth region. The plurality of regions doped with dopants of the first type also includes a fifth doped region and the plurality of regions doped with dopants of the second type also includes a sixth doped region. The fifth doped region and the sixth doped region include the third, seventh, and sixth regions. The fourth doped region is located between the first and fifth doped regions, and the third doped region is located between the second and sixth doped regions.

In some embodiments, the first doped region is in contact with the second doped region, and the third doped region is in contact with the fourth doped region.

In some embodiments, the third doped region is separated from the first doped region and the second doped region, and the fourth doped region is separated from the first doped region and the second doped region.

In some embodiments, the first semiconductor structure is made of a first semiconductor material having a first index of refraction, and the second semiconductor structure is made of a second semiconductor material having a second index of refraction that is different from the first index of refraction.

In accordance with some embodiments, a method includes transmitting light into the first semiconductor structure of any optical switch device described herein while a first voltage satisfying a first voltage condition is applied between the first doped region and the second doped region for coupling the light from the first waveguide to the second waveguide.

In some embodiments, the method also includes, prior to, or subsequent to, coupling the light from the first waveguide to the second waveguide, transmitting the light into the first semiconductor structure while a second voltage satisfying a second voltage condition different from the first voltage condition is applied between the first doped region and the second doped region for propagating the light within the first waveguide without coupling the light from the first waveguide to the second waveguide.

In some embodiments, the second semiconductor structure has a first carrier density while the first voltage is applied between the first doped region and the second doped region, and the second semiconductor structure has a second carrier density that is greater than the first carrier density by a factor of at least 100 while the second voltage is applied between the first doped region and the second doped region.

In some embodiments, the light is coupled from the first waveguide to the second waveguide while the optical switch device is at a temperature between 40 Kelvin and 200 Kelvin.

In some embodiments, applying the second voltage between the first doped region and the second doped region while the optical switch device is at a temperature less than 40 Kelvin allows coupling of the light from the first waveguide to the second waveguide.

In accordance with some embodiments, an optical switch device includes a first waveguide including a first portion coupled with a first region doped with first dopants and a second portion coupled with a second region doped with second dopants. The optical switch device also includes a second waveguide located adjacent to the first waveguide for coupling light from the first waveguide to the second waveguide. The second waveguide includes a third portion coupled with a third region doped with first dopants and a fourth portion coupled with a fourth region doped with second dopants. The first portion is located adjacent to the third portion and the second portion is located adjacent to the fourth portion.

In some embodiments, the first waveguide includes a plurality of first portions coupled with regions doped with the first dopants and a plurality of second portions coupled with regions doped with the second dopants. The plurality of first portions is interleaved with the plurality of second portions. The second waveguide includes a plurality of third portions coupled with regions doped with the first dopants and a plurality of fourth portions coupled with regions doped with the second dopants. The plurality of third portions is interleaved with the plurality of fourth portions.

In some embodiments, the first region and the second region are configured to receive a voltage satisfying a first voltage condition between the first region and the second region, and the third region and the fourth region are not configured to receive a voltage satisfying the first voltage condition between the third region and the fourth region.

In some embodiments, the optical switch device also includes a resistive heater located adjacent to the first waveguide and the second waveguide for changing a temperature of the first waveguide and the second waveguide.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 1F illustrates the power of light remaining in a first waveguide for selected carrier densities in a second waveguide, for three different example configurations.

FIG. 1G illustrates example free carrier densities needed to achieve a certain efficiency in the optical switch device.

FIG. 9 is a flowchart illustrating a method of operating an optical switch device in accordance with some embodiments.

Like reference numerals refer to corresponding parts throughout the several views of the drawings. The drawings may not be drawn to scale unless stated otherwise.

DETAILED DESCRIPTION

Figure 1A:
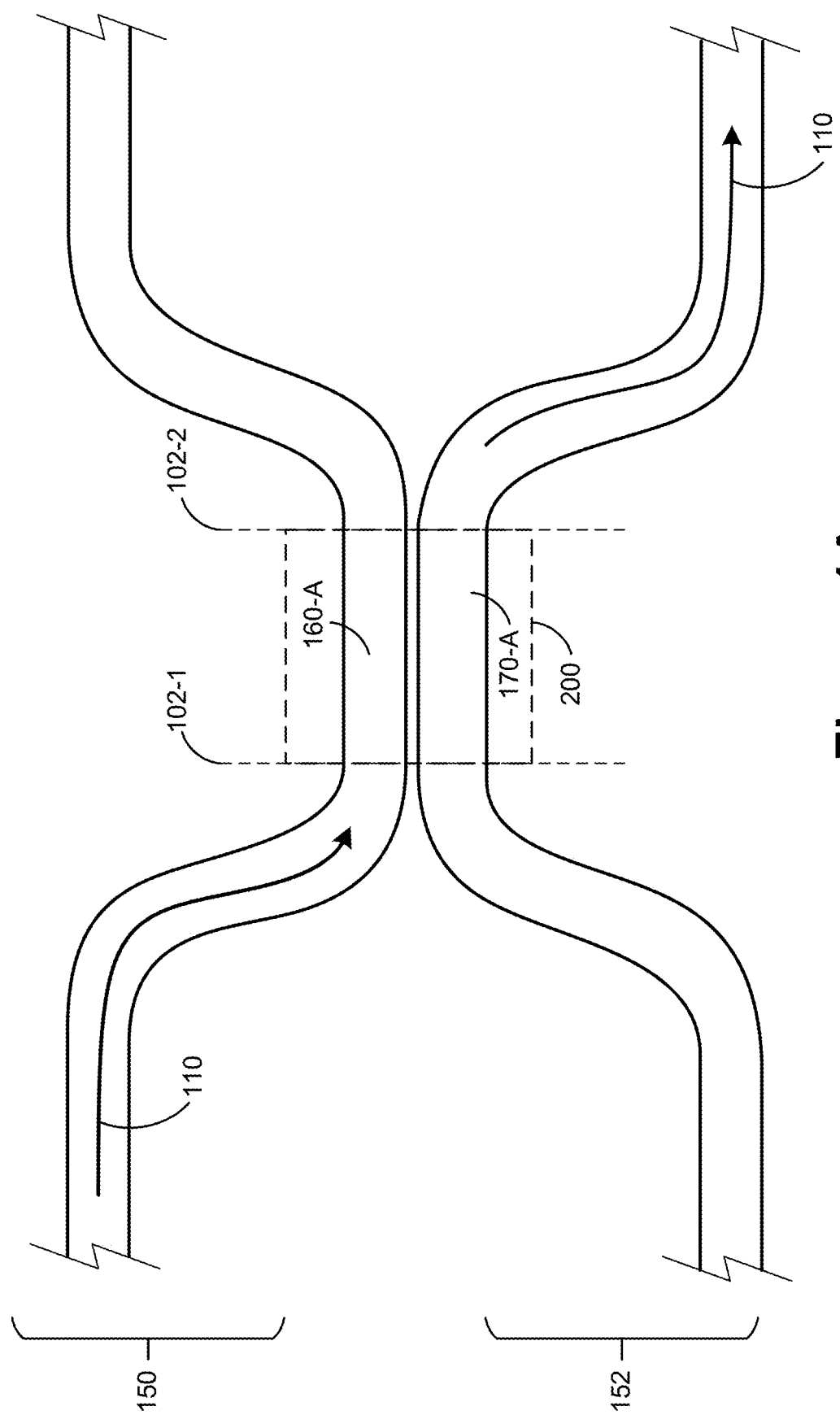
FIGS. 1A and 1B are partial plan views of an optical switch device illustrating optical paths of light propagating within the optical switch device in accordance with some embodiments.

Deficiencies and other problems associated with optical switch devices including phase shifters are reduced or eliminated by the optical switch devices and methods described herein. The disclosed optical switch devices and methods utilize modulation of absorption properties of one or more optical waveguides for switching operations. Such modulation of absorption properties can allow the optical switch devices to operate as a binary switch (e.g., the optical switch device is in an "off" state while the modulated absorption property of a particular optical waveguide is above a threshold absorption value and the optical switch device is in an "on" state while the modulated absorption property of the particular optical waveguide is below the threshold absorption value), thereby eliminating the need for monitoring and tuning phase shifts induced by phase shifters and enabling compact and robust optical switch devices.

In addition, the disclosed optical switch devices may include structures that facilitate large modulation of the absorption properties of the one or more optical waveguides. This further reduces the size of the optical switch devices and also eliminates the need for a high voltage source.

In some cases, the optical switch devices may include multi-mode optical waveguides, which reduces the optical loss associated with interaction between light propagating within an optical waveguide and the side walls of the optical waveguide, which, in turn, reduces the loss of the transmitted light.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first waveguide could be termed a second waveguide, and, similarly, a second waveguide could be termed a first waveguide, without departing from the scope of the various described embodiments. The first waveguide and the second waveguide are both waveguides, but they are not the same waveguide. In another example, a first semiconductor structure could be termed a second semiconductor structure, and, similarly, a second semiconductor structure could be termed a first semiconductor structure, without departing from the scope of the various described embodiments. The first semiconductor structure and the second semiconductor structure are both semiconductor structures, but they are not the same semiconductor structure.

Figure 1B:
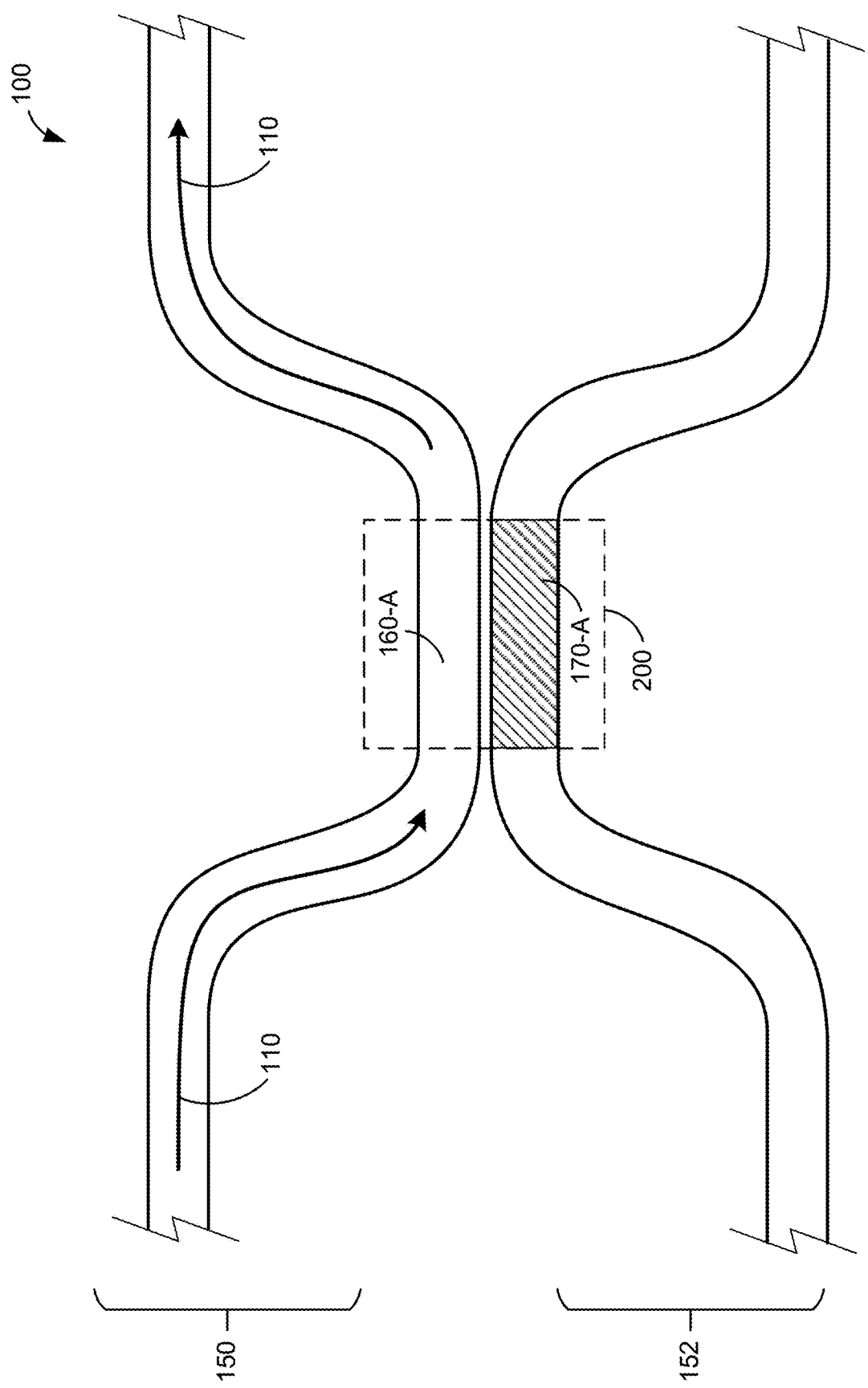

FIGS. 1A and 1B illustrate partial plan views of optical paths of light in an optical switch device 100 in accordance with some embodiments.

The optical switch device 100 includes a first waveguide 150 and a second waveguide 152 that is distinct and separate from the first waveguide 150. A portion 160-A of the first waveguide 150 is optically coupled to a portion 170-A of the second waveguide 152 in a coupling region 200 so that light 110 propagating in the first waveguide 150 is transferred to the second waveguide 152 through evanescent coupling as shown in FIG. 1A while the absorption property of the coupled portion 170-A of the second waveguide 152 is below a threshold absorption value.

A coupling efficiency between the first waveguide 150 and the second waveguide 152 is determined based on the length of the portions 160-A and 170-A, in addition to the real and imaginary refractive index of the first waveguide 150, the real and imaginary refractive index of the second waveguide 152, the width and height of the first waveguide 150, the width and height of the second waveguide 152, the real and imaginary refractive index of the material located between the first waveguide 150 and the second waveguide 152, and the distance between the first waveguide 150 and the second waveguide 152. In some embodiments, the distance between the first waveguide 150 and the second waveguide 152 is selected to increase the coupling efficiency between the first waveguide 150 and the second waveguide 152. In some embodiments, the distance between the first waveguide 150 and the second waveguide 152 is less than 200 nm, between 100 nm and 300 nm, between 200 nm and 400 nm, between 300 nm and 500 nm, or greater than 400 nm, although other distances may be used, depending on the other dimensions of the first waveguide 150 and the second waveguide 152 and selection of the materials for the first waveguide 150 and the second waveguide 152. In some embodiments, the length of the coupled portion 160-A of the first waveguide 150 or the coupled portion 170-A of the second waveguide 152 (i.e., the distance between lines 102-1 and 102-2) is selected so that the coupling efficiency between the first waveguide 150 and the second waveguide 152 (for a given set of parameters for the refractive index of the first waveguide 150, the refractive index of the second waveguide 152, the width and height of the first waveguide 150, the width and height of the second waveguide 152, the refractive index of the material located between the first waveguide 150 and the second waveguide 152, and the distance between the first waveguide 150 and the second waveguide 152) is close to 100% (e.g., greater than 99%). In some embodiments, the length of the coupled portion 160-A of the first waveguide 150 or the coupled portion 170-A of the second waveguide 152 is between 5 μm and 200 μm but other lengths are possible without departing from the scope of the present disclosure.

FIG. 1B illustrates that the absorption property of the portion 170-A of the second waveguide 152 in the coupling region is increased above the threshold absorption value so that the light 110 propagating in the first waveguide 150 remains within the first waveguide 150 without transferring to the second waveguide 152.

Without limiting the scope of claims, this can be described with a numerical model, in which the amplitudes of light within the first waveguide 150 and the second waveguide 152 satisfy the following:

$$\partial_x a_1(z) = i\kappa a_2(z)$$

$$\partial_x a_2(z) = i\kappa a_1(z) + i\Delta\beta\kappa a_2(z)$$

where $a_1$ and $a_2$ are the amplitudes of light within the first waveguide 150 and the second waveguide 152, $\kappa$ is a coupling constant for the evanescent coupling between the first waveguide 150 and the second waveguide 152, and $\Delta\beta$ represents a tunable shift in the propagation constant of the second waveguide 152, with both real part (associated with the propagation phase) and imaginary part (associated with the loss).

Figure 1C:
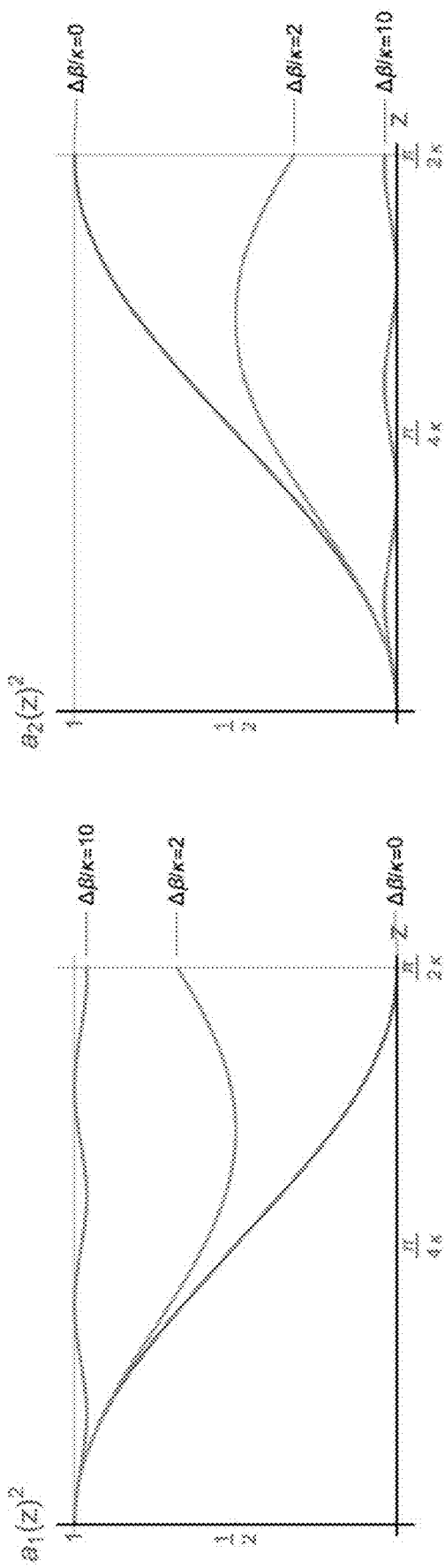
FIG. 1C illustrates example intensity values of light within the waveguides shown in FIGS. 1A and 1B for different real components of a propagation constant of a waveguide.

FIG. 1C illustrates the intensity of the light within the first waveguide 150 (shown on the left-hand side) and the intensity of the light within the second waveguide 152 (shown on the right-hand side) based on changing the real part (associated with the propagation phase) of the propagation constant of the second waveguide 152. As shown in FIG. 1C, by adjusting the real component of $\Delta\beta/\kappa$ from 0 to 10, the intensity of light transferred from the first waveguide 150 to the second waveguide 152 after a propagation length $z=\pi(2\kappa)$ changes from near 100% to near 0%. Thus, the device 100 can operate as an optical switch by changing the real component of $\Delta\beta$.

Figure 1D:
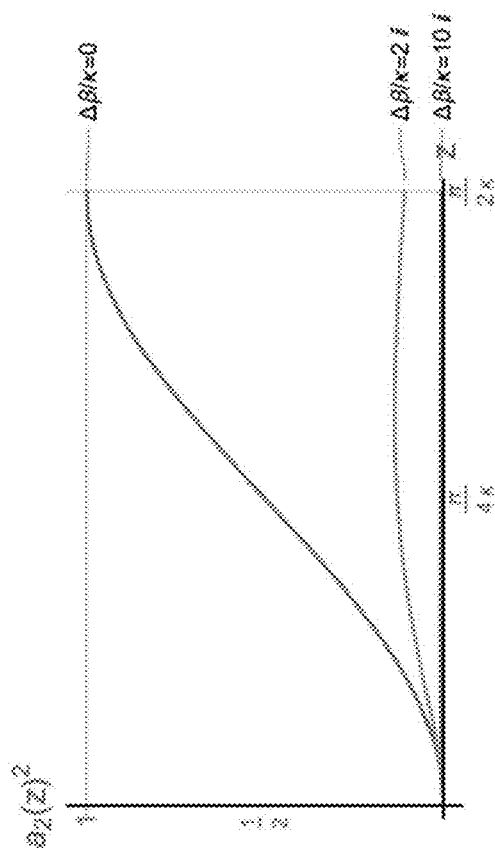
FIG. 1D illustrates example intensity values of light within the waveguides shown in FIGS. 1A and 1B for different imaginary components of a propagation constant of a waveguide.
Figure 1D:
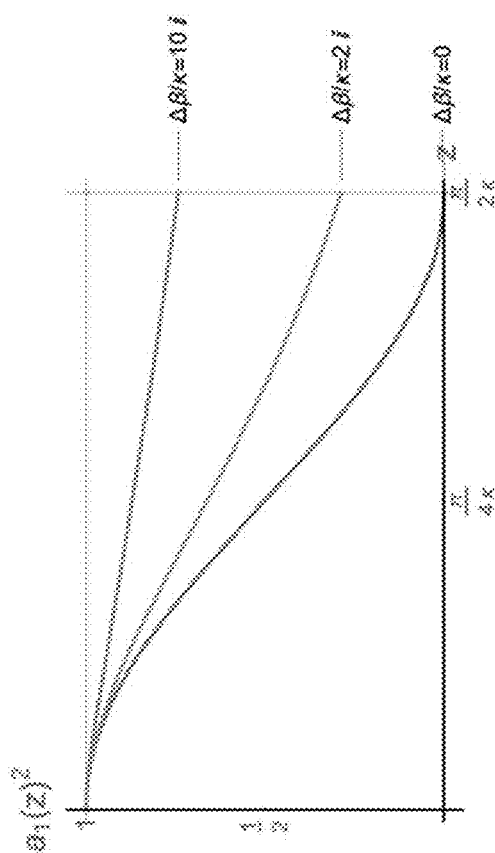

FIG. 1D illustrates the intensity of the light within the first waveguide 150 (shown in the left-hand side) and the intensity of the light within the second waveguide 152 (shown on the right-hand side) based on changing the imaginary part (associated with the optical loss) of the propagation constant of the second waveguide 152. As shown in FIG. 1D, by adjusting the imaginary component of $\Delta\beta/\kappa$ from 0 to 10, the intensity of light transferred from the first waveguide 150 to the second waveguide 152 after the propagation length $z=\pi/(2\kappa)$ changes from near 100% to near 0%. Thus, the device 100 can also operate as an optical switch by changing the imaginary component of $\Delta\beta$.

Figure 1E:
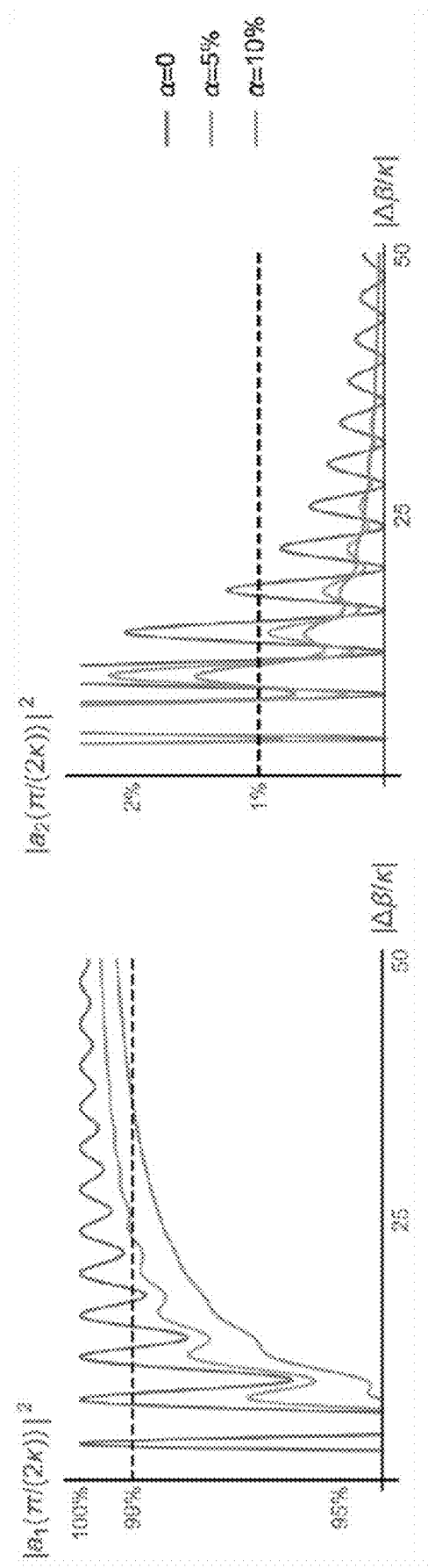
FIG. 1E illustrates example intensity values of light within the waveguides shown in FIGS. 1A and 1B for different phases of a propagation constant.

FIG. 1E illustrates the intensity of the light within the first waveguide 150 (shown in the left-hand side) and the intensity of the light within the second waveguide 152 (shown on the right-hand side) based on changing $|\Delta\beta/\kappa|$. As shown in FIG. 1E, when a ratio $\alpha$ between the real imaginary component and the real component of $\Delta\beta$ is at least 5% (in this particular configuration), the intensity of the light within the first waveguide guide 150 and the intensity of the light within the second waveguide 152 remain relatively stable compared to the case where the imaginary component of $\Delta\beta$ is zero. For example, when $\alpha=5\%$, for a range where $|\Delta\beta/\kappa|>25$, at least 99% of the light within the first waveguide 150 remains within the first waveguide 150 and less than 1% of the light within the first waveguide 150 is transferred to the second waveguide 152, regardless of the phase shift in $\Delta\beta$. Thus, the circuits for monitoring and adjusting the phase shift in $\Delta\beta$ can be simplified.

In some embodiments, a propagation constant of a waveguide is changed by adjusting a density of free carriers (e.g., electrons or holes) within the waveguide, which, in turn, changes the refractive index of the material constituting the waveguide. In particular, increasing the density of free carriers increases the absorption of light within the waveguide at least in part due to the increased free carrier absorption. FIG. 1F illustrates simulation results showing the power of light remaining in the first waveguide 150 for example carrier densities in the second waveguide 152 ranging from $10^{17}$ cm$^{-3}$ to $10^{19}$ cm$^{-3}$, for three different configurations (left: the gap between the first waveguide 150 and the second waveguide 152 is 300 nm, middle: the gap between the first waveguide 150 and the second waveguide 152 is 400 nm, and right: the gap between the first waveguide 150 and the second waveguide 152 is 450 nm). Waveguides 150 and 152 made of silicon and each having a width of 500 nm and a thickness of 220 nm were used in the numerical simulation. When the carrier density of the second waveguide 152 is $10^{17}$ cm$^{-3}$, the intensity of light within the first waveguide 150 decreases to near 0% as the propagation length increases (indicating that the light is transferred from the first waveguide 150 to the second waveguide 152), and when the carrier density of the second waveguide 152 is $10^{19}$ cm$^{-3}$, the intensity of light within the first waveguide 150 remains near 100% regardless of the propagation length. Thus, changing the carrier density in a silicon waveguide from $10^{17}$ cm$^{-3}$ to $10^{19}$ cm$^{-3}$, for example, changes the operating mode of the optical switch device 100 from the evanescently coupled mode (as shown in FIG. 1A) to a non-coupled mode (as shown in FIG. 1B).

FIG. 1G illustrates the example free carrier densities needed to achieve high efficiency (e.g., less than 0.1 dB loss) in the two states (the "on" state corresponding to the evanescently coupled mode and the "off" state corresponding to the non-coupled mode) of the optical switch device 100. The left chart indicates that the optical switch device 100 in the "on" state has less than 0.1 dB loss (e.g., less than 0.1 dB of the light remains in the first waveguide 150) while the carrier density within the second waveguide 152 remains less than approximately 416 cm$^{-3}$ (for a 400 μm coupling length optical switch). The middle chart indicates that the optical switch device 100 in the "off" state has less than 0.1 dB loss (e.g., less than 0.1 dB of the light is transferred out of the first waveguide 150) while the carrier density within the second waveguide 152 remains greater than approximately 618 cm$^{-3}$ (for the 400 μm coupling length optical switch). The schematic diagram shown on the right side of FIG. 1G illustrates that the optical switch device 100 having a particular coupling length alternates between a low loss (e.g., less than 0.1 dB loss) "on" state and a low loss "off" state by changing the free carrier density within the second waveguide 152. In some implementations, switching between the two switch states may require changing the free carrier density by 100 fold or more (e.g., 150 fold from 416 $cm^{-3}$ to 618 $cm^{-3}$) for example to maintain the high efficiency (e.g., less than 0.1 dB loss), although a person having ordinary skill in the art would understand that different free carrier densities or different ratios of the free carrier densities may be used (e.g., depending on the materials used in forming the first waveguide 150, the second waveguide 152, the material between the first waveguide 150 and the second waveguide 152, their structures, and a loss tolerance).

Thus, the optical switch device 100 with a high efficiency may require a high spatial contrast in the free carrier density between the first waveguide 150 and the second waveguide 152 (e.g., the first waveguide 150 has ~$10^{16}$ $cm^{-3}$ carrier density or higher while the second, adjacent waveguide 152 has ~$10^{19}$ $cm^{-3}$ carrier density or lower during the "off" state of the optical switch device 100) and a high temporal contrast in the free carrier density in the second waveguide 152 (e.g., the second waveguide 152 has ~$10^{16}$ $cm^{-3}$ carrier density or higher while the optical switch is in the "on" state and the second waveguide 152 has ~$10^{19}$ $cm^{-3}$ carrier density or lower while the optical switch device 100 is in the "off" state).

In some cases, the density of free carriers (e.g., electrons or holes) within the waveguide is adjusted by utilizing the field-ionization effect. The field-ionization effect is beneficial when the optical switch device 100 is at a low temperature (e.g., below 100K, below 70K, below 40K, etc.). At room temperature, dopant atoms commonly used in the semiconductor industry are ionized and contribute carriers to the conduction or valence band. "N-type" dopants, such as arsenic or phosphor in silicon, contribute an electron to the conduction band of the silicon, whereas "p-type" dopants, such as boron in silicon, contribute a hole to the valence band. If the ambient temperature is lowered sufficiently, however, the dopant atoms retain their carriers and remain neutral. This is called "dopant freezeout." This freezeout occurs at temperatures where kT (k=Boltzmann's constant) is small relative to the activation energy of the dopant, where the activation energy corresponds to the energy difference between the dopant's defect level and the relevant band edge. The activation energy of common dopants (e.g. boron, arsenic, and phosphor) in silicon is ~45-50 meV and carrier freezeout starts at a temperature around approximately 100-200K and becomes more significant at lower temperatures. However, if an electric field is applied to frozen dopants, the dopants can be ionized, even at extremely low temperatures so that the ionized dopants can contribute carriers to the conduction or valence band. In some cases, the electric field required to ionize common dopants in Si (e.g., via tunneling) is approximately 0.1-0.5 V/µm. In some cases, dopants can be ionized via impact of a free carrier while a sufficiently high current density is driven through a semiconductor containing frozen dopants. This also facilitates increasing the density of free carriers.

In some embodiments, the propagation constant of the waveguide is changed by utilizing one or more of the DC Kerr effect and the Franz-Keldysh effect in addition to, or instead of, adjusting a density of free carriers (e.g., electrons or holes) within the waveguide. Alternatively, the propagation constant of the waveguide may be changed by using one or more of: thermo-optic elements and stress-optic elements.

FIGS. 2A-2D, 3A-3D, 4A-4B, 5A-5B, 6A-6F, 7A-7B, and 8A-8B illustrate example configurations of an optical switch device that provide the high spatial contrast as well as the high temporal contrast in the free carrier density in accordance with some embodiments. In addition, the configurations illustrated in FIGS. 2A-2D, 3A-3D, 4A-4B, 5A-5B, 6A-6F, 7A-7B, and 8A-8B are capable of switching operations even at low temperatures (e.g., a freeze-out temperature below 200 Kelvin).

Figure 2A:
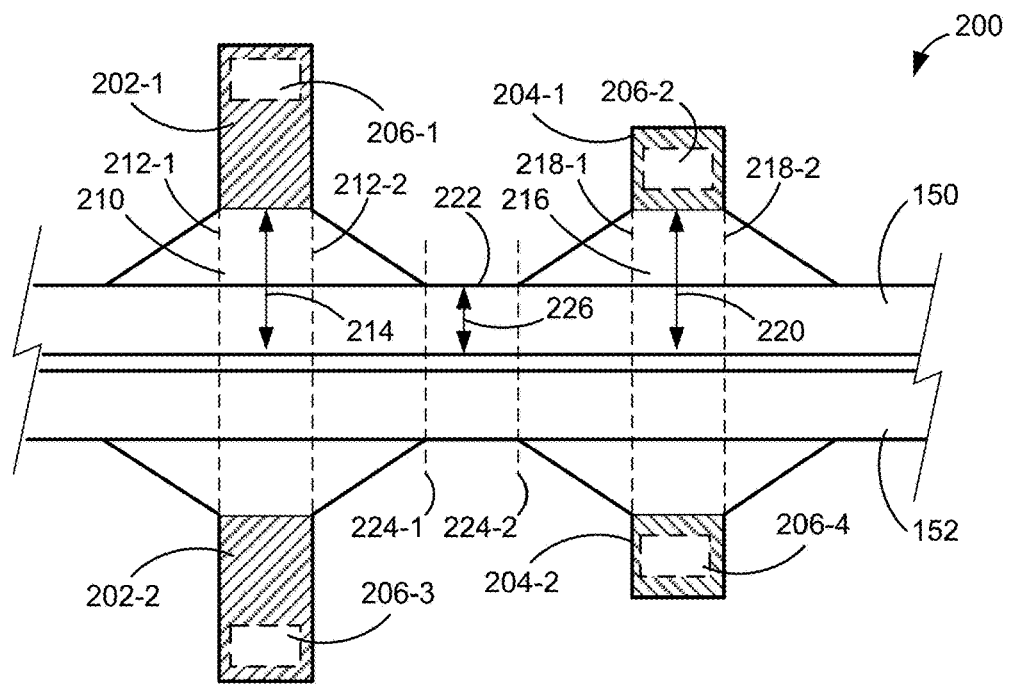
FIGS. 2A and 2B are enlarged views of a coupling region of the optical switch device shown in FIGS. 1A and 1B in accordance with some embodiments.
Figure 2B:
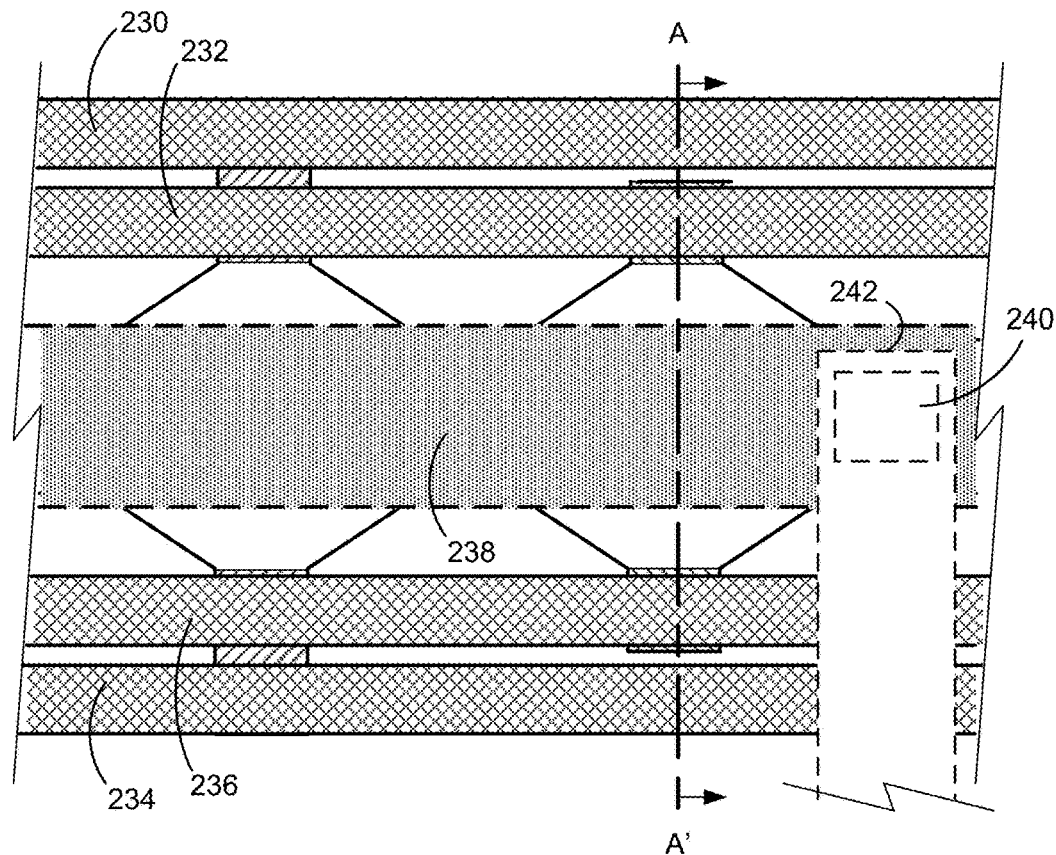

FIGS. 2A and 2B are enlarged views of the coupling region 200 of the optical switch device 100 shown in FIGS. 1A and 1B in accordance with some embodiments.

The coupling region 200 includes the first waveguide 150 and the second waveguide 152. The first waveguide 150 is located adjacent to a first doped region 202-1 and a second doped region 204-1. The first doped region 202-1 is doped with dopants of a first type (e.g., p-type dopants, such as boron, gallium, and indium), and the second doped region 204-1 is doped with dopants of a second type (e.g., n-type dopants, such as phosphorus, arsenic, antimony, bismuth, and lithium) so that a voltage applied between the first doped region 202-1 and the second doped region 204-1 increases the free carrier density in the first waveguide 150 (e.g., in region 210). In some cases, the voltage is applied between a via 206-1 electrically connected to the first doped region 202-1 and a via 206-2 electrically connected to the second doped region 204-1.

In some embodiments, the first waveguide 150 is doped with dopants of the first type at a first dopant concentration and the first doped region 202-1 is doped with dopants of the first type at a second dopant concentration that is higher than the first dopant concentration. In some embodiments, the first waveguide 150 is doped with dopants of the second type at a third dopant concentration and the second doped region 202-1 is doped with dopants of the second type at a fourth dopant concentration that is higher than the third dopant concentration.

The first waveguide 150 has a region 210 (located between lines 212-1 and 212-2) that is electrically coupled to the first doped region 202-1 and a region 216 (located between lines 218-1 and 218-2) that is electrically coupled to the second doped region 204-1, where the region 210 and the region 216 are separated by at least a region 222 (located between lines 224-1 and 224-2). In some embodiments, the region 210 has a width 214 that is greater than a width 226 of the region 222 so that the width of the optical waveguide 150 varies from the width 214 to the width 226 between the region 210 and the region 222, and the region 216 has a width 220 that is greater than the width 226 of the region 222 so that the width of the optical waveguide 150 varies from the width 220 to the width 226 between the region 216 and the region 222. Compared to a configuration in which the first doped region 202-1 is directly connected to an optical waveguide without a width-varying region, this configuration facilitates propagation of light within the optical waveguide 150 (e.g., by eliminating right angle corners that can cause scattering of light). In some embodiments, the width 214 and the width 220 are identical. In some embodiments, the width 214 is different from the width 220.

In some configurations, the second waveguide 152 has a structure that is a mirror image of the structure of the first waveguide 150. For example, the second waveguide 152 has same widths and heights as those of the first waveguide 150. In some cases, this symmetric configuration is used for coupling light between two waveguides made of a same material (e.g., silicon, silicon nitride, silicon oxynitride, indium phosphide, gallium arsenide, aluminum gallium arsenide, lithium niobite, or any other suitable photonic material including silicon and/or germanium based materials). In some embodiments, the first waveguide 150 and the second waveguide 152 are made of different materials (e.g., the first waveguide 150 is made of silicon and the second waveguide 152 is made of silicon nitride).

As explained above with respect to FIG. 1A, the material and dimensions of the waveguides 150 and 152 and the surrounding region may be selected to increase the coupling efficiency between the first waveguide 150 and the second waveguide 152 while the optical switch device is in the "on" state. For brevity, such details are not repeated herein.

In some embodiments, the second waveguide 152 is located adjacent to a third doped region 202-2 and a fourth doped region 204-2. The third doped region 204-1 is doped with dopants of the first type, and the fourth doped region 204-2 is doped with dopants of the second type so that a voltage applied between the third doped region 202-2 and the fourth doped region 204-2 increases the free carrier density in the second waveguide 152. This allows adjusting the carrier density in the second waveguide 152 separately (and sometimes independently) from the carrier density in the first waveguide 150. In some cases, the voltage is applied between a via 206-3 electrically connected to the third doped region 202-2 and a via 206-4 electrically connected to the fourth doped region 204-2. In addition, the second waveguide 152 may have regions of different widths that correspond to respective regions of the first waveguide 150, which, in turn, facilitates the distribution of the free carriers within the second waveguide 152. In some embodiments, the second waveguide 152 is not in electrical contact with any region doped with a same dopant concentration as the first doped region 202-1 or the second doped region 204-1. In some embodiments, the second waveguide 152 is not in electrical contact with any doped region.

FIG. 2B illustrates structural elements located above the first waveguide 150 and the second waveguide 152, including lines 230, 232, 234, and 236. In some embodiments, the lines 230, 232, 234, and 236 are formed in one or more metal layers, which may be formed in the back-end-of-line processing. Alternatively, the lines 230, 232, 234, and 236 may be made of semiconductor materials, which may be formed in the front-end-of-line processing. The line 230 is electrically coupled to the first doped region 202-1 through the via 206-1 (shown in FIG. 2A) and the line 232 is electrically coupled to the second doped region 204-1 through the via 206-2 (shown in FIG. 2A) so that the voltage between the line 230 and the line 232 is applied between the first doped region 202-1 and the second doped region 204-1. Similarly, the line 234 is electrically coupled to the third doped region 202-2 through the via 206-3 (shown in FIG. 2A) and the line 236 is electrically coupled to the fourth doped region 204-2 through the via 206-4 (shown in FIG. 2A) so that the voltage between the line 234 and the line 236 is applied between the third doped region 202-2 and the fourth doped region 204-2.

In some embodiments, a first voltage is applied between the lines 230 and 232 while a second voltage different from the first voltage, such as a zero voltage or a non-zero voltage that is different from the first voltage, is applied between the lines 234 and 236 so that the free carrier concentration in the first waveguide 150 is changed. In some implementations, the first voltage provides a forward bias so that free carriers are injected into the first waveguide 150, thereby increasing the free carrier density and the absorption property value of the first waveguide 150. For example, for a configuration in which the first doped region 202-1 is doped with p-type dopants and the second doped region 204-1 is doped with n-type dopants, applying a higher voltage (e.g., a positive voltage) to the first doped region 202-1 and applying a lower voltage (e.g., a negative voltage) to the second doped region 204-1 provides a forward bias.

FIG. 2B also illustrates a resistive heater 238 located above the first waveguide 150 and the second waveguide 152. In some cases, the resistive heater 238 is a thin film resistor made of a resistive material (e.g., tungsten, titanium nitride, tantalum nitride, amorphous silicon, silicides, such as tungsten silicide and nickel silicide, etc.). The resistive heater 238 is coupled to power lines, such as a line 242 by one or more vias (e.g., via 240). When an electrical current flows through the resistive heater 238, the resistive heater 238 generates heat, which may be used to adjust the coupling ratio between the first waveguide 150 and the second waveguide 152 while the optical switch device 100 is in the "off" state (allowing the coupling of light between the first waveguide 150 and the second waveguide 152).

Figure 2C:
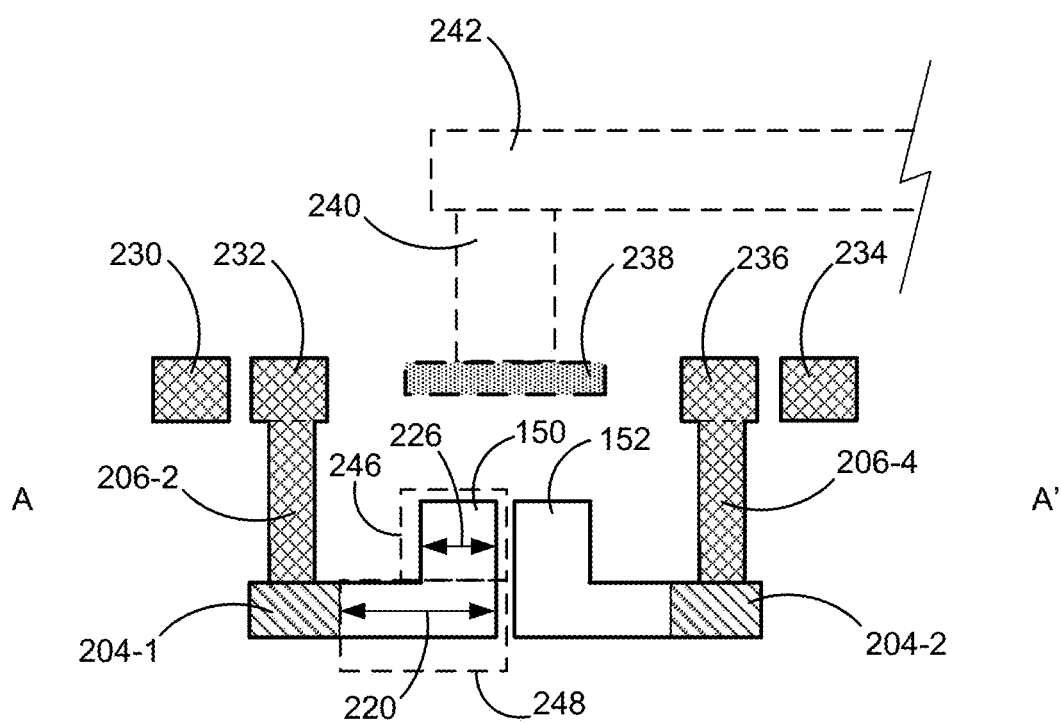
FIG. 2C is a cross-sectional view of the coupling region shown in FIG. 2B.

Line AA' represents a view from which the cross-section shown in FIG. 2C is taken. As shown in FIG. 2C, the first waveguide 150 and the second waveguide 152 may be rib waveguides, where each rib waveguide has a rib region 246 having the width 226 (corresponding to the width 226 of the region 222 shown in FIG. 2A) located over a slab region 248 having the width 214 (corresponding to the width 220 of the region 216) that is greater than the width 226. In some cases, the first waveguide 150 having a rib waveguide configuration confines an optical mode of light propagating within the first waveguide 150 horizontally toward the rib region 246. In some cases, this reduces an optical interaction between the propagating light and the doped region 204-1. In some cases, this facilitates coupling of light between the first waveguide 150 and the second waveguide 152.

In FIG. 2C, the lines 230, 232, 234, and 236 are located within a same layer (sometimes called a first metal layer or an M1 layer). Alternatively, the lines 230, 232, 234, and 236 may be located in different layers. For example, the lines 232 and 236 are located within the first metal layer and the lines 230 and 234 are located within a third metal layer (also called an M3 layer) while the line 242 is located within a second metal layer (also called an M2 layer).

Figure 2D:
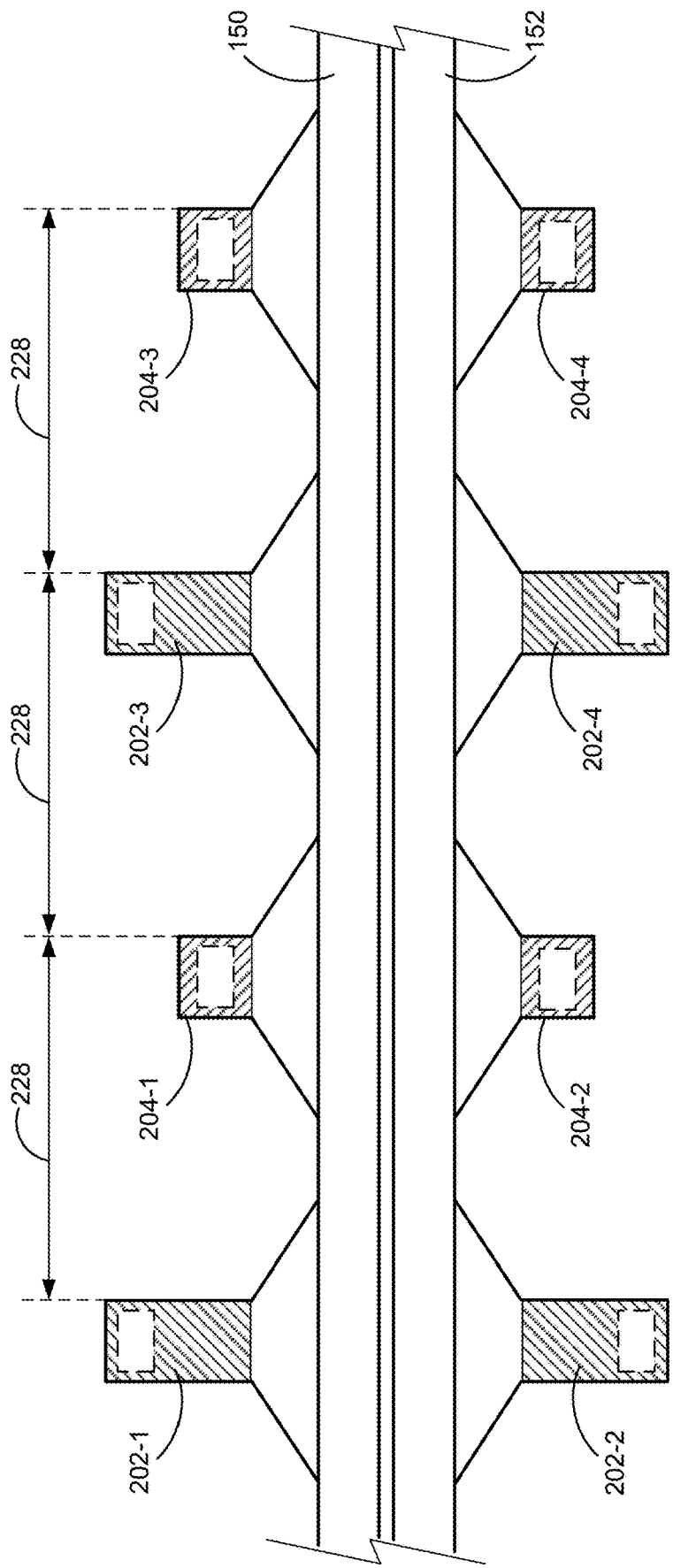
FIG. 2D is an enlarged view of the coupling region with multiple instances of the structure shown in FIG. 2A.

Although FIGS. 2A and 2B show only one region doped with the dopants of the first type (i.e., the first doped region 202-1) and only one region doped with the dopants of the second type (i.e., the second doped region 204-1) adjacent to the first waveguide 150, multiple regions doped with the dopants of the first type (e.g., regions 202-1 and 202-3) and multiple regions doped with the dopants of the second type (e.g., regions 204-1 and 204-3) may be located adjacent to the first waveguide 150 as shown in FIG. 2D. Similarly, multiple regions doped with the dopants of the first type (e.g., regions 202-2 and 202-4) and multiple regions doped with the dopants of the second type (e.g., regions 204-2 and 204-4) may be located adjacent to the second waveguide 152. The regions doped with the dopants of the first type are interleaved with the regions doped with the dopants of the second type (e.g., the region 204-1 is located between the regions 202-1 and 202-3 and the region 202-3 is located between the regions 204-1 and 204-3).

In some embodiments, the pitch 228 from the first doped region 202-1 to the second doped region 204-1 is the same as the pitch 228 from the second doped region 204-1 to the region 202-3 and the pitch 228 from the region 202-3 to the region 204-3. In some embodiments, the pitch 228 is 40 μm or less, 20 μm or less, 10 μm or less, or 5 μm or less, although other pitches may be used. In some embodiments, the pitch 228 from the first doped region 202-1 to the second doped region 204-1 is different from at least one of: a pitch from the second doped region 204-1 to the region 202-3 and a pitch from the region 202-3 to the region 204-3.

Figure 3A:
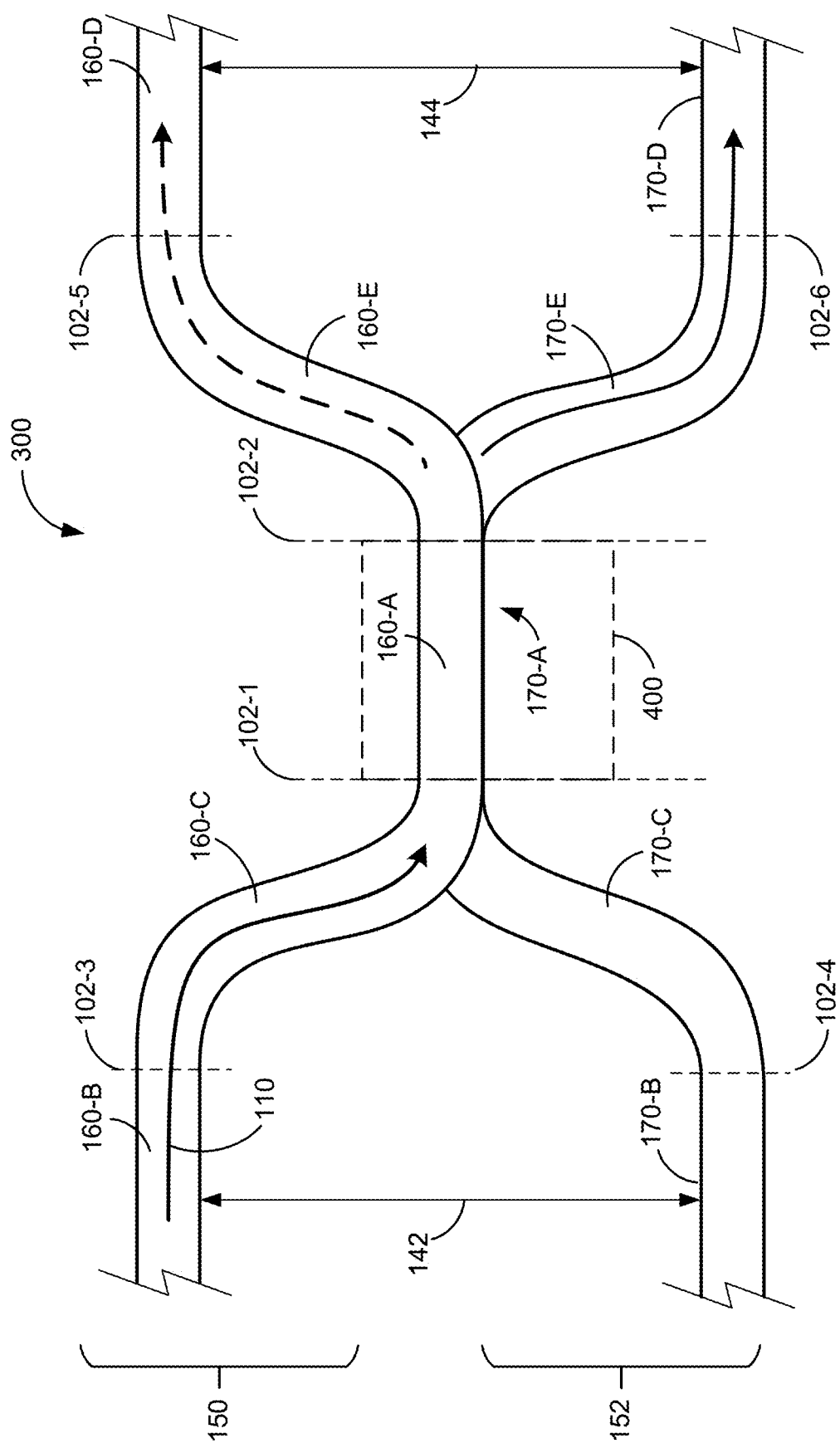
FIGS. 3A and 3B are partial plan views of an optical switch device in accordance with some embodiments, in which optical waveguides are stacked vertically.
Figure 3B:
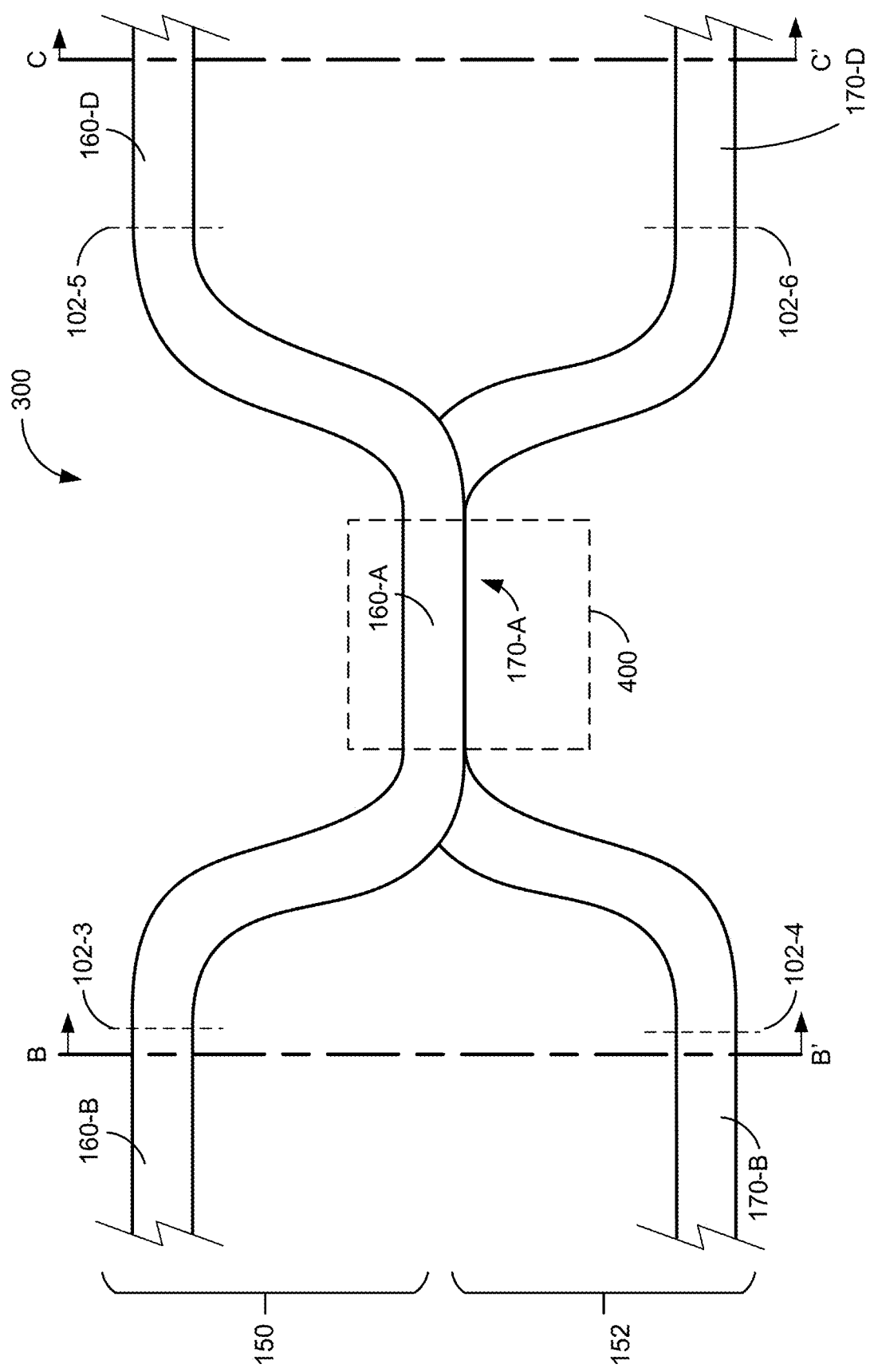

FIGS. 3A and 3B are partial plan views of an optical switch device 300 in accordance with some embodiments. The optical switch device 300 is similar to the optical switch device 100 except that the two waveguides 150 and 152 of the optical switch device 300 are stacked vertically within a stacked coupling region 400.

In addition to the portions 160-A and 170-A described above with respect to FIG. 1A, the optical waveguide 150 also includes a portion 160-B and the optical waveguide also include a portion 170-B. The portion 160-B is coupled to the portion 160-A via a portion 160-C located between lines 102-3 and 102-1, and the portion 170-B is coupled to the portion 170-A via a portion 170-C located between lines 102-4 and 102-1. In some embodiments, the portion 160-C is curved as shown in FIG. 3A. In some embodiments, the portion 160-C is straight. In some embodiments, the portion 170-C is curved as shown in FIG. 3A. In some embodiments, the portion 170-C is straight. In some embodiments, at least one of the portion 160-C and the portion 170-C is curved.

FIG. 3A also shows a portion 160-D of the first waveguide 150 and a portion 170-D of the second waveguide 152. The portion 160-D is coupled to the first portion 160-A via a portion 160-E located between lines 102-2 and 102-5, and the portion 170-D is coupled to the portion 170-A via a portion 170-E located between lines 102-2 and 102-6. In some embodiments, the portion 160-E is curved as shown in FIG. 3A. In some embodiments, the portion 160-E is straight. In some embodiments, the portion 170-E is curved as shown in FIG. 3A. In some embodiments, the portion 170-E is straight. In some embodiments, at least one of the portion 160-E and the portion 170-E is curved.

In some embodiments, at least one of the portions 160-C, 170-C, 160-E, and 170-E includes two or more curved sections (e.g., any of the portions 160-C, 170-C, 160-E, and 170-E can have two or more curved sections having different centers of curvature, such as curved sections forming an s-curve). In some embodiments, the specific shape of the curves is designed to ensure adiabaticity of the optical mode of light as the light travels through the curved portion (e.g., light launched into the first curve in the fundamental mode will largely remain in the fundamental mode while propagating through the curves). As one of ordinary skill in the art would appreciate, the requirement for adiabaticity ensures that the excitation of higher order modes is reduced, e.g., excitation of higher order transverse modes, back scattered modes, and/or radiative modes, is minimized as the light travels through the curved sections. Depending on the geometric constraints of the device layout, any number of different types of curves can be used including, e.g., Euler bends, Bezier curves, S-curves and the like. Furthermore, the specific geometry that satisfies the adiabaticity condition will depend on the index of refraction around the waveguide itself. Thus, the curve shape at the input portion (e.g., the curve of a portion of the waveguide section 160-C proximate to line 102-3) may be different from the curve at the output portion (e.g., the curve of a portion of the waveguide section 160-C proximate to the coupling region, just before the line 102-1). These curves may be different because the presence of the other waveguide just above or just below may affect the local refractive index near the bend and thereby change the adiabaticity condition in that region.

As shown in FIG. 3A, light 110 injected into the portion 160-B of the first waveguide 150 propagates toward the portion 160-C and enters the first portion 160-A, where the light 110 is coupled to the portion 170-A while the absorption property of the portion 170-A is below a threshold absorption value, and subsequently, the light 110 propagates within the second waveguide 152 from the portion 170-A through the portion 170-E toward the portion 170-D. Alternatively, the light 110 remains within the first waveguide 150 while the absorption property of the portion 170-A is above the threshold absorption value and propagates from the portion 160-A through the portion 160-E toward the portion 160-D.

In some embodiments, at least one of the first waveguide 150 and the second waveguide 152 is a multi-mode waveguide. In some embodiments, both the first waveguide 150 and the second waveguide 152 are multi-mode waveguides. In slab or planar waveguides, some of the losses occur when transmitted light comes into contact with walls that have irregular surfaces. Planar waveguides fabricated with the currently available semiconductor fabrication techniques typically have top and bottom surfaces that are smoother than side walls (e.g., the surface roughness of the top and bottom surfaces is lower than the surface roughness of the side walls). The optical loss can decrease by reducing interaction between light propagating within the optical waveguide and the side walls. The disclosed embodiments include optical waveguides that are wide and short so that the distance between the side walls is greater than the distance between the top and bottom surfaces. This configuration reduces the interaction between the transmitted light and the side walls. In particular, when a fundamental mode is transmitted through the wide and short optical waveguide, the fundamental mode has a width that extends less toward the side walls of the optical waveguide, compared to a fundamental mode transmitted through a single mode waveguide. This, in turn, reduces the loss of the transmitted light. In such embodiments, the portions 160-A, 170-A, 160-B, 170-B, 160-C, 170-C, 160-E, 170-E, 160-D, and 170-E may be portions of multi-mode waveguides. In some embodiments, a multi-mode waveguide is characterized by a width that is greater than a height of the multi-mode waveguide.

Figure 3C:
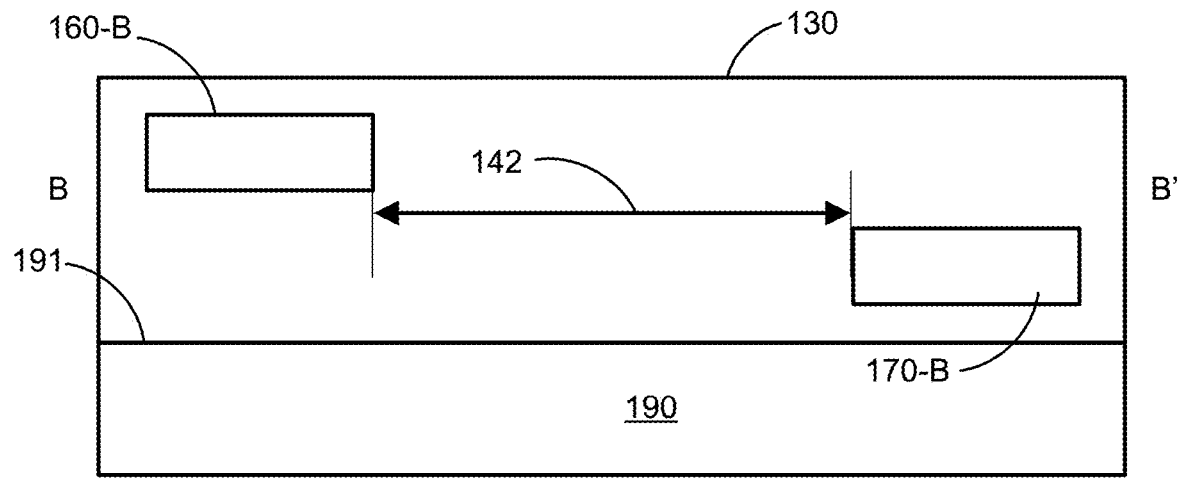
FIGS. 3C and 3D are cross-sectional views of the optical switch device shown in FIG. 3A.
Figure 3D:
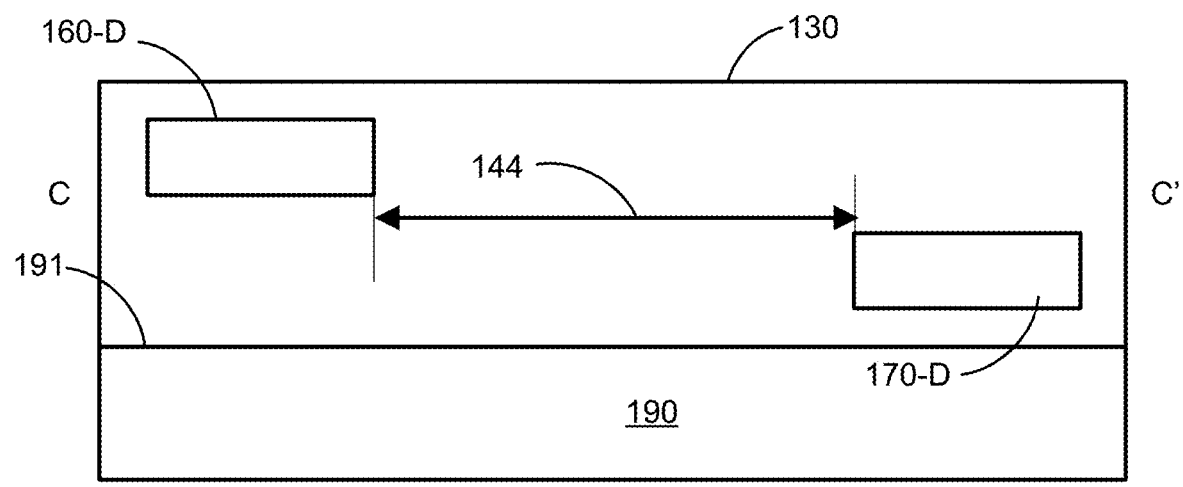

FIG. 3B is similar to FIG. 3A, except that lines BB' and CC' are indicated in FIG. 3B. Line BB' represents a view from which the cross-section shown in FIG. 3C is taken and line CC' represents a view from which the cross-section shown in FIG. 3D is taken.

Returning to FIG. 3A, the portion 160-B has a first lateral distance 142, greater than a distance 140 (shown in FIG. 4A) between the portion 160-A of the first waveguide 150 and the portion 170-A of the second waveguide 152, to the portion 170-B. As shown in FIG. 3C, the first lateral distance 142 is an edge-to-edge distance between the portion 160-B and the portion 170-B on a plane that is parallel to a surface 191 of a substrate 190. In some embodiments, the first lateral distance 142 is at least 1 μm, but one of ordinary skill in the art will appreciate that this lateral distance depends on many factors including the waveguide width, curve design, index of refraction of the waveguide core and surrounding material, etc. The first lateral distance 142 between the portion 160-B and the portion 170-B is significantly greater than the distance 140 between the first portion 160-A and the second portion 160-B. As a result, light does not effectively couple between the third portion 160-B and the fourth portion 170-B.

Returning to FIG. 3A, the portion 160-D has a second lateral distance 144, greater than the distance 140, to the portion 170-D. As shown in FIG. 3D, the second lateral distance 144 is an edge-to-edge distance between the portion 160-D and the portion 170-D on a plane that is parallel to the surface 191 of the substrate 190. In some embodiments, the second lateral distance 144 between the portion 160-D and the portion 170-D is identical to the first lateral distance 142 between the portion 160-B and the portion 170-B. In some embodiments, the second lateral distance 144 between the portion 160-D and the portion 170-D is different from the first lateral distance 142 between the portion 160-B and the portion 170-B.

Figure 4A:
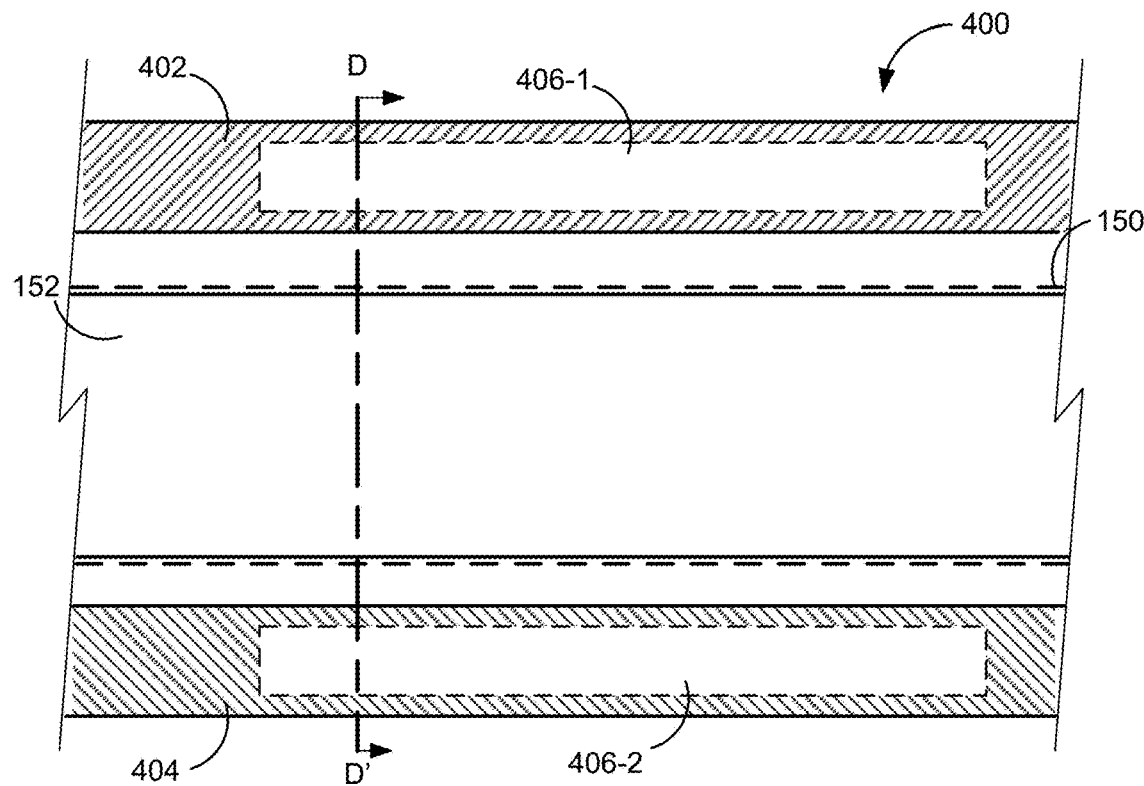
FIG. 4A is an enlarged view of a coupling region of the optical switch device shown in FIG. 3A in accordance with some embodiments.

FIG. 4A is an enlarged view of the stacked coupling region 400 of the optical switch device shown in FIG. 3A in accordance with some embodiments.

In FIG. 4A, the stacked coupling region 400 includes the first waveguide 150 and the second waveguide 152 that are stacked vertically.

FIG. 4A also shows a first doped region 402 and a second doped region 404 that are located on opposite sides of the second waveguide 152 so that a voltage applied between the first doped region 402 and the second doped region 404 increases the free carrier density in the second waveguide 152. In some cases, the voltage is applied between a via 406-1 that is electrically coupled to the first doped region 402 and a via 406-2 that is electrically coupled to the second doped region 404.

Figure 4B:
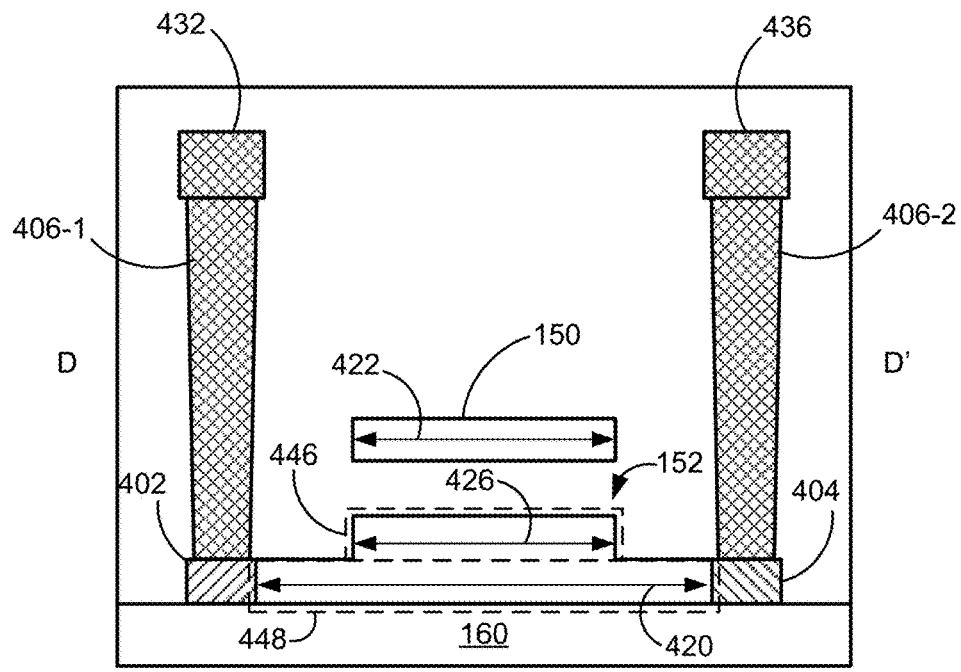
FIG. 4B is a cross-sectional view of the coupling region shown in FIG. 4A.

Line DD' represents a view from which the cross-section shown in FIG. 4B is taken. In FIG. 4B, the first waveguide 150 is located above the second waveguide 152. Alternatively, the second waveguide 152 may be located above the first waveguide 150.

As shown in FIG. 4B, the second waveguide 152 may be a rib waveguide with a rib region 446 having the width 426 located over a slab region 448 having the width 420 that is greater than the width 426. The width 422 of the first waveguide 150 is the same as the width 426 of the rib region 446. Alternatively, the width 422 of the first waveguide 150 may be different from the width 426 of the rib region 446. In FIG. 4B, the dash lines indicating the rib region 446 and the slab region 448 are offset from the boundaries of the rib region 446 and the slab region 448 for clarity.

The first doped region 402 is electrically connected to a line 432 through the via 406-1 and the second doped region 404 is electrically connected to a line 436 through the via 406-2 so that the voltage between the line 432 and the line 436 is applied between the first doped region 402 and the second doped region 404.

Figure 5A:
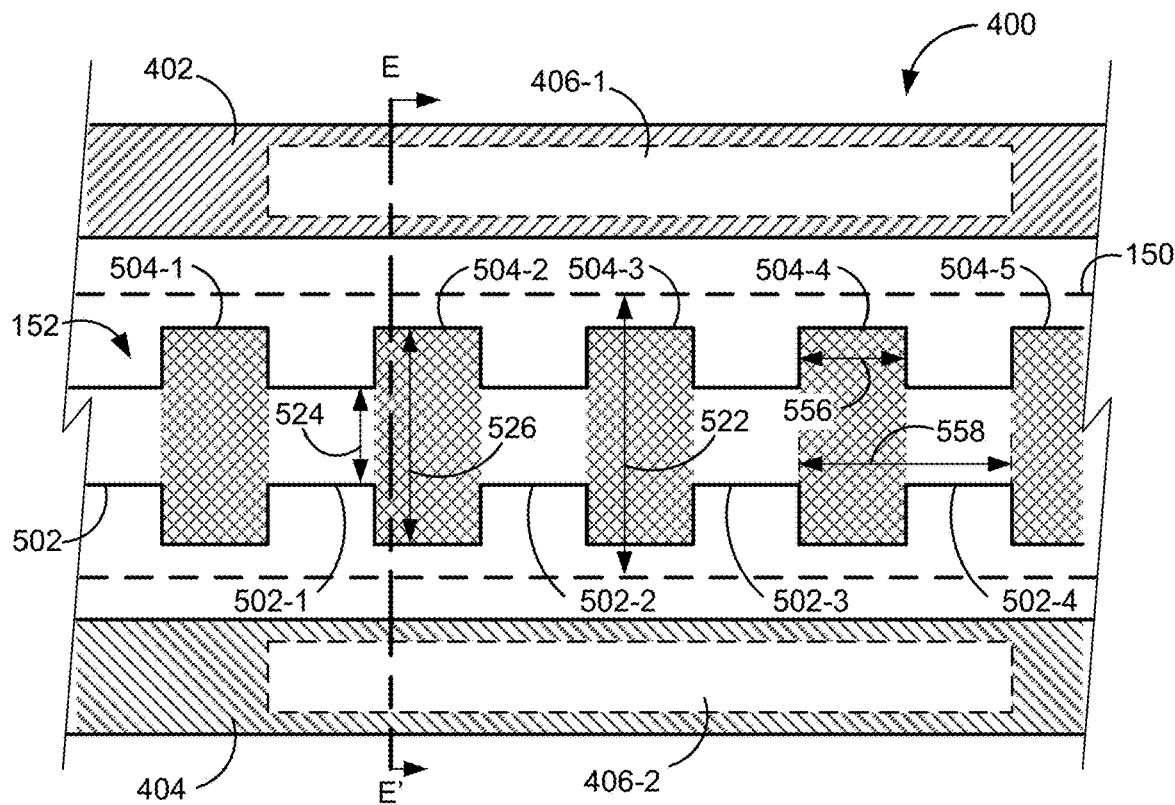
FIG. 5A is an enlarged view of the coupling region of the optical switch device shown in FIG. 3A in accordance with some embodiments.

FIG. 5A is an enlarged view of the stacked coupling region 400 of the optical switch device shown in FIG. 3A in accordance with some other embodiments.

The stacked coupling region 400 shown in FIG. 5A is similar to the stacked coupling region 400 shown in FIG. 4A except that the second waveguide 152 in FIG. 5A is a planar ribbed waveguide with regions 502 (e.g., regions 502-1 through 502-4) having a width 524 interleaved with regions 504 (e.g., regions 504-1 through 504-5) having a width 526 that is different from the width 524. At least one of the width 524 and the width 526 is different from the width 522 of the first waveguide 150. In some configurations, both the width 524 and the width 526 are different from the width 522. A respective region 504 has a length 556, which may be less than 1 µm, less than 2 µm, less than 3 µm, less than 4 µm, less than 5 µm, less than 6 µm, less than 7 µm, less than 8 µm, less than 9 µm, less than 10 µm, between 100 nm and 1 µm, between 500 nm and 2 µm, between 1 µm and 3 µm, between 2 µm and 4 µm, between 3 µm and 5 µm, between 4 µm and 6 µm, between 5 µm and 7 µm, between 6 µm and 8 µm, between 7 µm and 9 µm, between 8 µm and 10 µm, although the respective region 504 may have a different length. The regions 504 have a pitch 558, which may be less than 1 µm, less than 2 µm, less than 3 µm, less than 4 µm, less than 5 µm, less than 6 µm, less than 7 µm, less than 8 µm, less than 9 µm, less than 10 µm, between 100 nm and 1 µm, between 500 nm and 2 µm, between 1 µm and 3 µm, between 2 µm and 4 µm, between 3 µm and 5 µm, between 4 µm and 6 µm, between 5 µm and 7 µm, between 6 µm and 8 µm, between 7 µm and 9 µm, or between 8 µm and 10 µm, although the respective region 504 may have a different pitch.

Figure 5B:
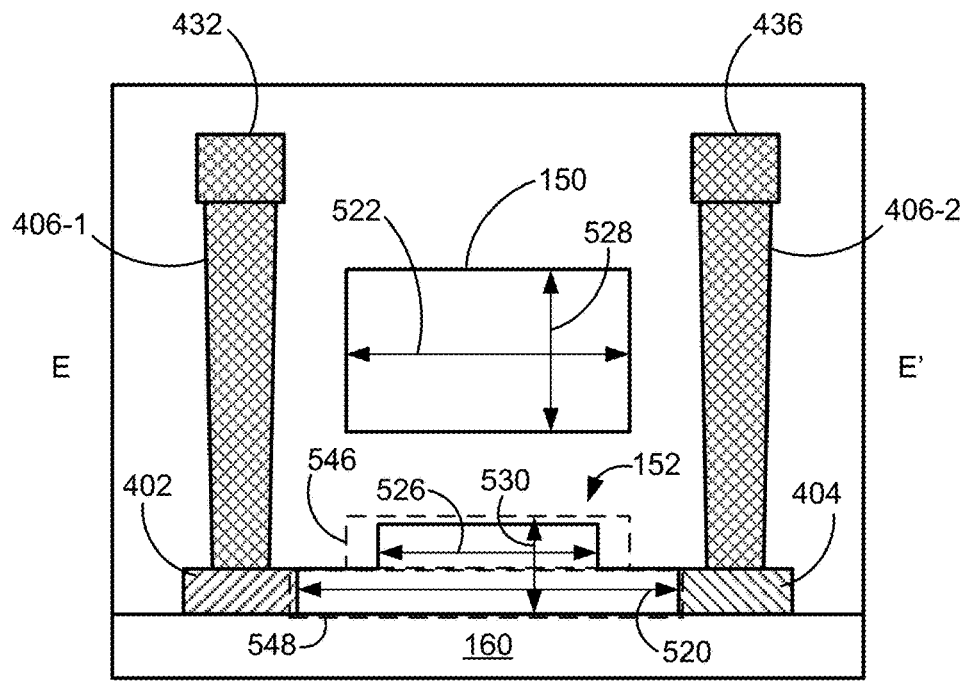
FIG. 5B is a cross-sectional view of the coupling region shown in FIG. 5A.

Line EE' represents a view from which the cross-section shown in FIG. 5B is taken. FIG. 5B is similar to FIG. 4B except that (i) the first waveguide 150 has a thickness 528 that is different from the thickness 530 of the second waveguide 152, and (ii) the width 522 is different from the width 526 as shown in FIG. 5A. In some implementations, the first waveguide 150 has a thickness that is the same as the thickness 528 of the second waveguide 152.

FIG. 5B also shows that a portion, having the width 526, of a rib region 546 of the second waveguide 152 is located over a slab region 548 having the width 520 that is greater than the width 526. In FIG. 5B, the dash lines indicating the rib region 546 and the slab region 548 are offset from the boundaries of the rib region 546 and the slab region 548 for clarity.

A ribbed waveguide (e.g., a planar ribbed waveguide as shown in FIGS. 5A and 5B or a vertical ribbed waveguide with alternating regions having different thicknesses) facilitates coupling of light between two optical waveguides having different refractive indices (e.g., a first waveguide made of a first material having a first refractive index and a second waveguide made of a second material having a second refractive index that is different from the first refractive index, such as the first waveguide made of silicon nitride having a refractive index of 1.9 and the second waveguide made of silicon having a refractive index of 3.48).

Figure 6A:
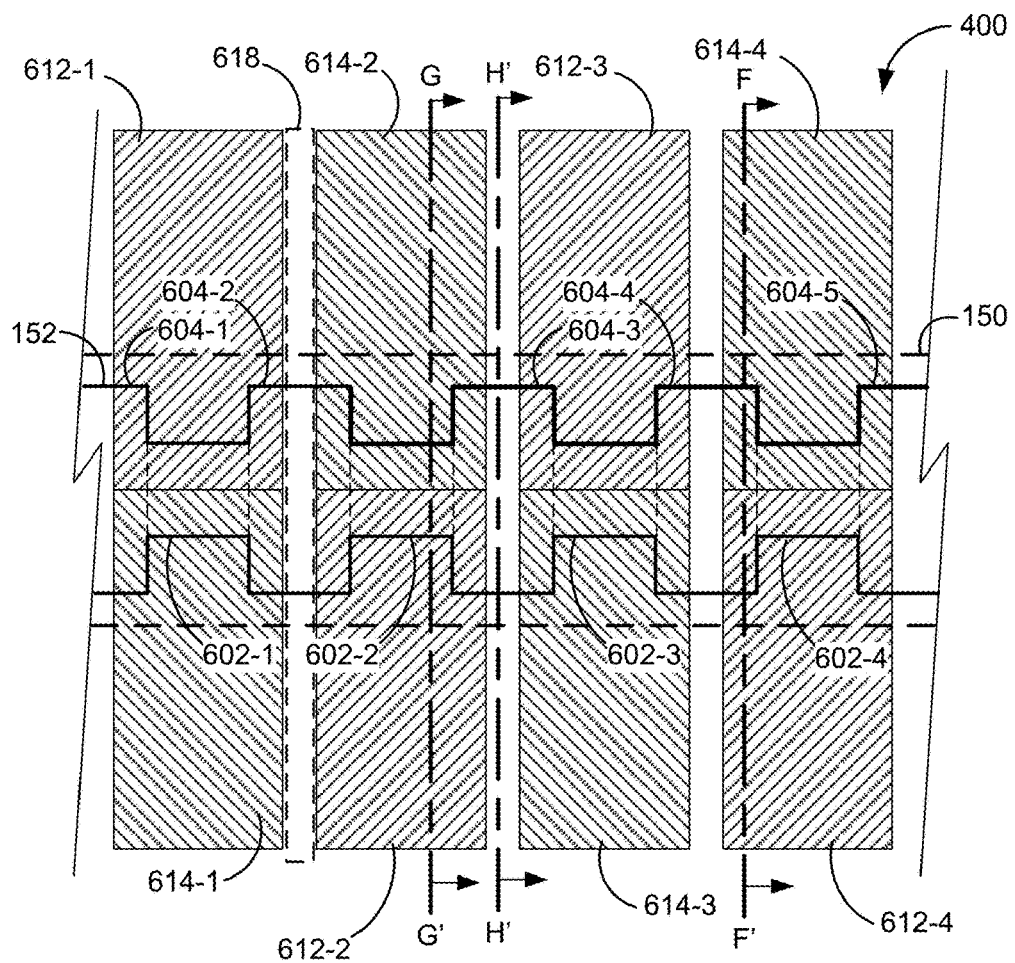
FIGS. 6A and 6E are enlarged views of the coupling region of the optical switch device shown in FIG. 3A in accordance with yet some other embodiments.
Figure 6B:
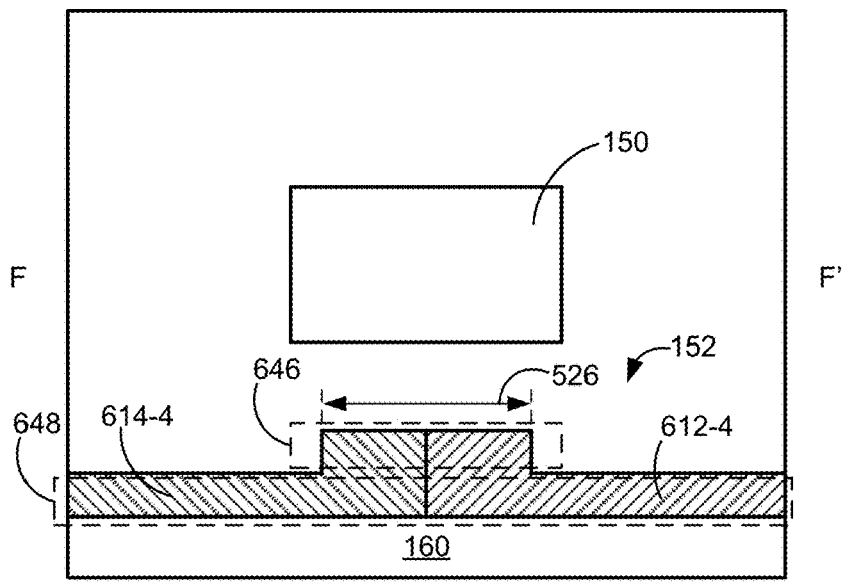
FIGS. 6B-6D are cross-sectional views of the coupling region shown in FIG. 6A.
Figure 6C:
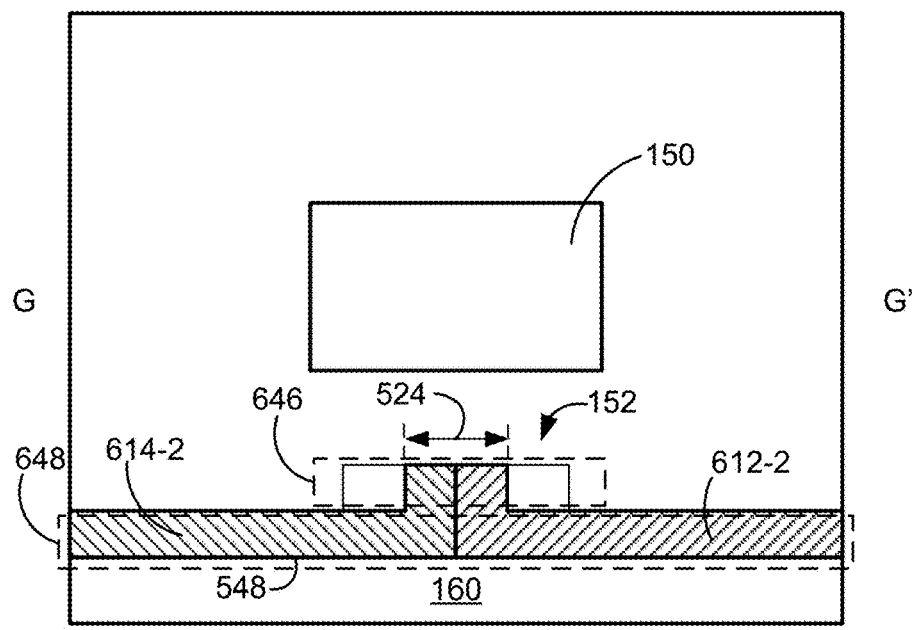
Figure 6D:
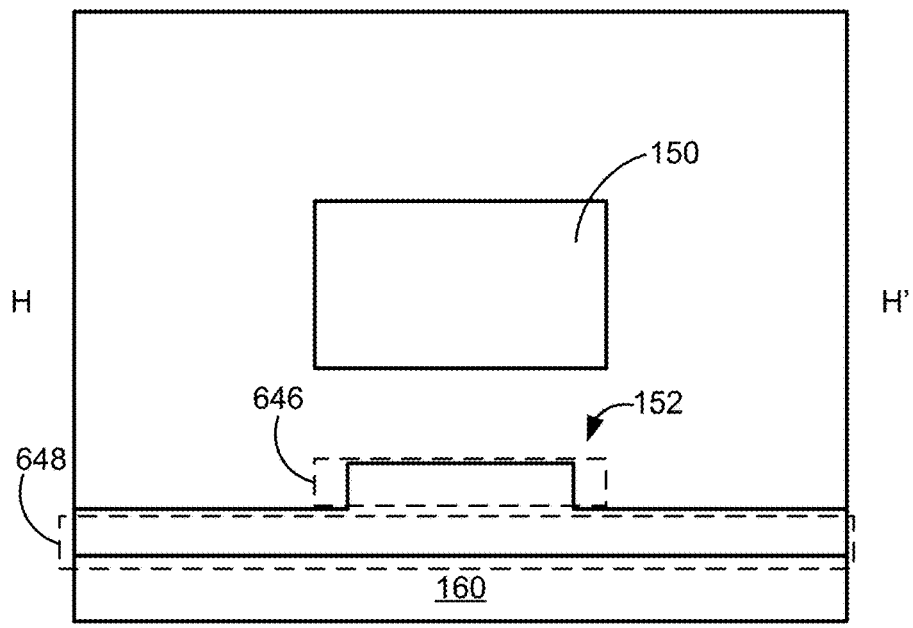
Figure 6E:
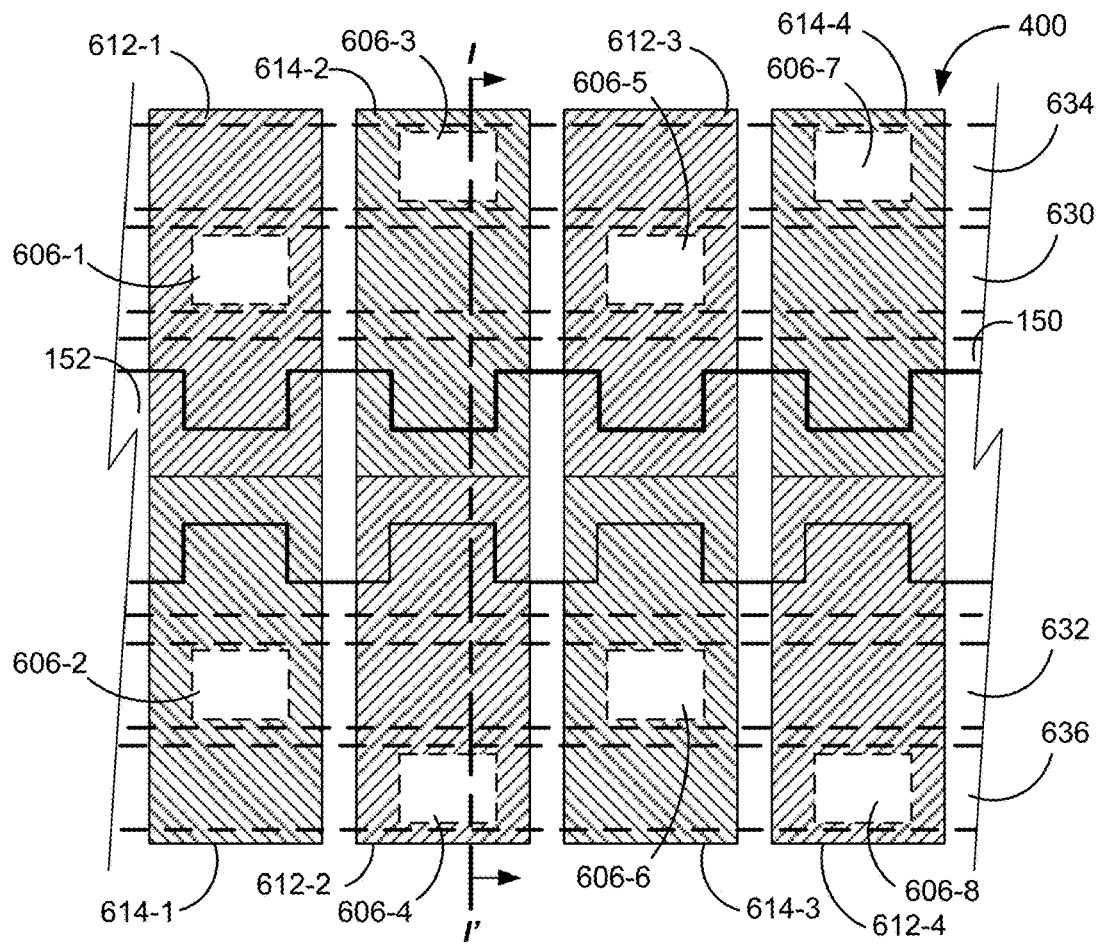

FIGS. 6A and 6E are enlarged views of the stacked coupling region 400 of the optical switch device shown in FIG. 3A in accordance with yet some other embodiments.

The stacked coupling region 400 shown in FIG. 6A is similar to the stacked coupling region shown in FIG. 5A at least in that the second waveguide 152 is a planar ribbed waveguide with interleaving regions 602 and 604 of different widths. However, the stacked coupling region 400 shown in FIG. 6A has a plurality of separate regions 612 (e.g., regions 612-1 through 612-4) doped with dopants of a first type and a plurality of separate regions 614 (e.g., regions 614-1 through 614-4) doped with dopants of a second type that is different from the dopants of the first type. Each region 612 is separate from the rest of the regions 612, and each region 614 is separate from the rest of the regions 614.

In FIG. 6A, regions 602 (e.g., regions 602-1 through regions 602-4) and regions 604 (e.g., regions 604-1 through 604-5) are offset from the doped regions 612 and 614. For example, the region 604-2 spans over the combination of regions 612-1 and 614-1 and the combination of regions 612-2 and 614-2 so that a portion of the region 604-2 is located within a combination of the doped regions 612-1 and 614-1 and a different portion of the region 604-2 is located within a combination of the doped regions 612-2 and 614-2. Similarly, a portion of the region 604-3 is located within a combination of the doped regions 612-2 and 614-2 and a different portion of the region 604-3 is located within a combination of the doped regions 612-3 and 614-3. A portion of the region 604-4 is located within a combination of the doped regions 612-3 and 614-3 and a different portion of the region 604-4 is located within a combination of the doped regions 612-4 and 614-4. A portion of the region 604-5 is located within a combination of the doped regions 612-4 and 614-4.

FIG. 6A also shows that the combination of doped regions 612-1 and 614-1 is located separately from the combination of doped regions 612-2 and 614-2, which is also located separately from the combination of doped regions 612-3 and 614-3. For example, a region 618 located between the combination of doped regions 612-1 and 614-1 and the combination of doped regions 612-2 and 614-2 is either undoped, or doped with dopants at a dopant concentration that is different from the dopant concentration of the doped region 612-1 or the doped region 614-1 (e.g., the dopant concentration of the region 618 is at least 10 times, 100 times, or 1000 times less than the dopant concentration of the doped region 612-1 or the doped region 614-1). The combination of regions 612-3 and 614-3 is also located separately from the combination of regions 612-4 and 614-4.

Line FF' represents a view from which the cross-section shown in FIG. 6B is taken. Line GG' represents a view from which the cross-section shown in FIG. 6C is taken. Line HH' represents a view from which the cross-section shown in FIG. 6D is taken.

FIG. 6B is similar to FIG. 5B except that the entire rib region 646 and the entire slab region 648 are doped. For example, a portion of the rib region 646 and the slab region 648 is doped with dopants of the first type, and the rest of the rib region 646 and the slab region 648 is doped with dopants of the second type.

FIG. 6C is similar to FIG. 6B except that the rib region 646 has the width 524 that is different from the width 526 of the rib region 646 shown in FIG. 6B.

FIG. 6D is similar to FIG. 6B except that the rib region 646 and the slab region 648 are not doped (or doped at a dopant concentration that is lower than the dopant concentration of the region 612-1 or the region 614-1).

This configuration allows a rapid change in the free carrier density in the second waveguide 152 by facilitating the movement of free carriers away from the intersection between two adjoining doped regions doped with dopants of different types (e.g., the intersection between the doped regions 612-1 and 614-1).

FIG. 6E illustrates structural elements located above the first waveguide 150 and the second waveguide 152, including lines 630, 632, 634, and 636. The line 634 is electrically coupled to the doped region 614-2 through the via 606-3 (shown in FIG. 6F) and the line 636 is electrically coupled to the doped region 612-2 through the via 606-4 (shown in FIG. 6F) so that the voltage between the line 634 and the line 636 is applied between the doped region 614-2 and the doped region 612-2. In addition, the line 634 is electrically coupled to the doped region 614-4 through the via 606-7 and the line 636 is electrically coupled to the doped region 612-4 through the via 606-8 so that the same voltage between the line 634 and the line 636 is applied between the doped region 614-4 and the doped region 612-4. Similarly, the line 630 is electrically coupled to the doped region 612-1 through the via 606-1 and the line 632 is electrically coupled to the doped region 614-1 through the via 606-2 so that the voltage between the line 630 and the line 632 is applied between the doped region 612-1 and the doped region 614-1. In addition, the line 630 is electrically coupled to the doped region 612-3 through the via 606-5 and the line 632 is electrically coupled to the doped region 614-3 through the via 606-6 so that the same voltage between the line 630 and the line 632 is applied between the doped region 612-3 and the doped region 614-3. In some implementations, the applied voltage provides a reverse bias so that free carriers move away from the junction between a respective region 612 and an adjoining region 614, thereby forming a depletion region and reducing the free carrier density and the absorption property value of the second waveguide 152. For example, for a configuration in which the regions 612 are doped with p-type dopants and the regions 614 are doped with n-type dopants, applying a lower voltage (e.g., a negative voltage) to the regions 612 and applying a higher voltage (e.g., a positive voltage) to the regions 614 provides a reverse bias.

Figure 6F:
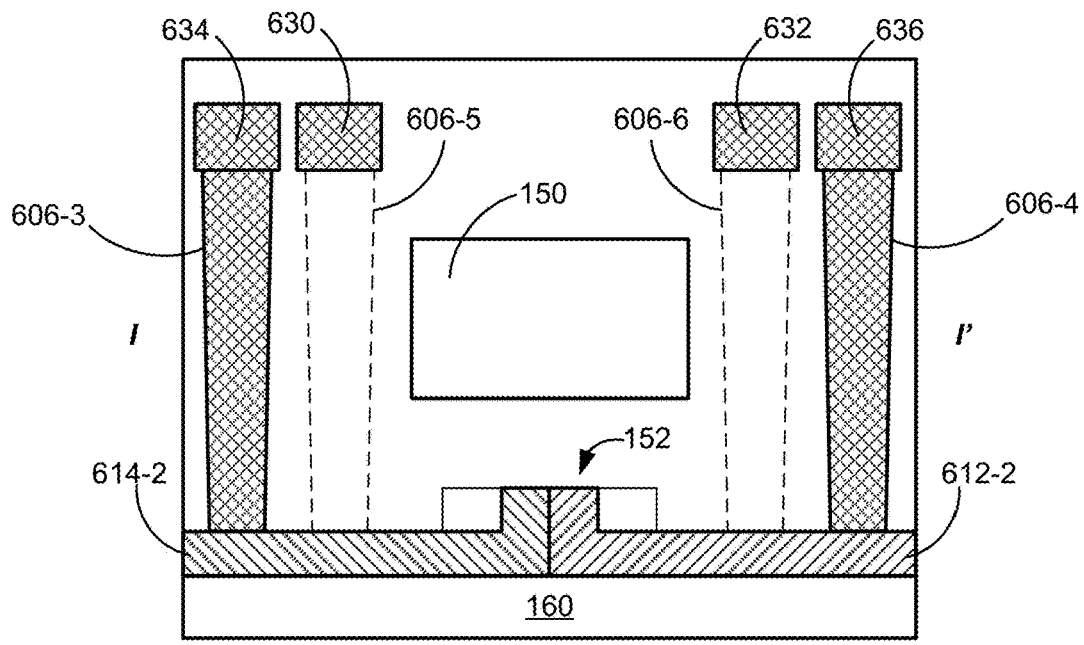
FIG. 6F is a cross-sectional view of the coupling region shown in FIG. 6E.

Line II' represents a view from which the cross-section shown in FIG. 6F is taken. FIG. 6F is similar to FIG. 6C except that FIG. 6F shows the lines 630, 632, 634, and 636 and vias 606-5, 606-6, 606-3, and 606-4 connecting the lines 630, 632, 634, and 636 to respective doped regions.

Figure 7A:
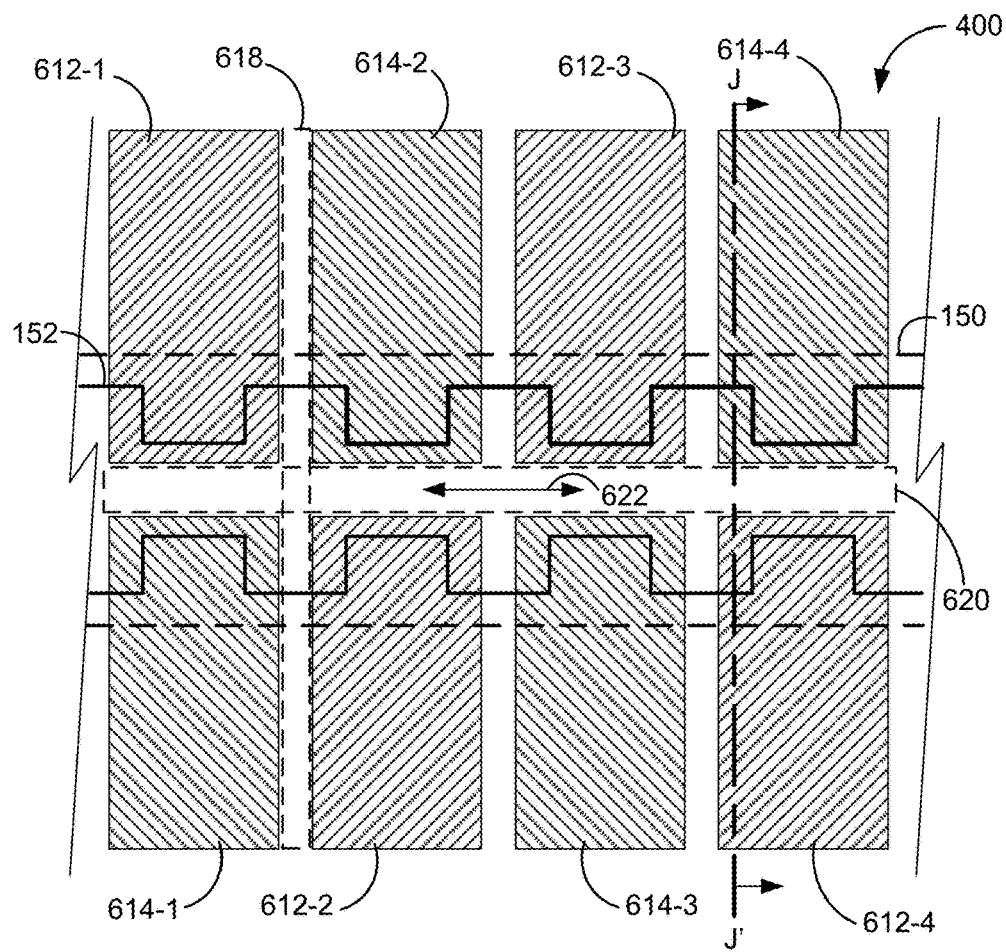
FIG. 7A is an enlarged view of the coupling region of the optical switch device shown in FIG. 3A in accordance with some embodiments.

FIG. 7A is an enlarged view of the coupling region of the optical switch device shown in FIG. 3A in accordance with some embodiments. FIG. 7A is similar to FIG. 6A except that the regions 612 doped with the dopants of the first type are located separately from the regions 614 doped with the dopants of the second type. For example, the doped region 612-1 in FIG. 7A is located separately from the doped region 614-1, whereas the doped region 612-1 in FIG. 6A is located in contact with the doped region 614-1. In particular, FIG. 7A shows a region 620 extending along a length-wise direction 622 of the second waveguide 152 and located between a respective region 612 doped with the dopants of the first type and an adjacent region 614 doped with the dopants of the second type. The region 620 is either undoped, or doped with dopants at a dopant concentration that is different from the dopant concentration of the doped region 612-1 or the doped region 614-1 (e.g., the dopant concentration of the region 618 is at least 10 times, 100 times, or 1000 times less than the dopant concentration of the doped region 612-1 or the doped region 614-1). In some implementations, the regions 618 and 620 have the same dopant concentration.

Figure 7B:
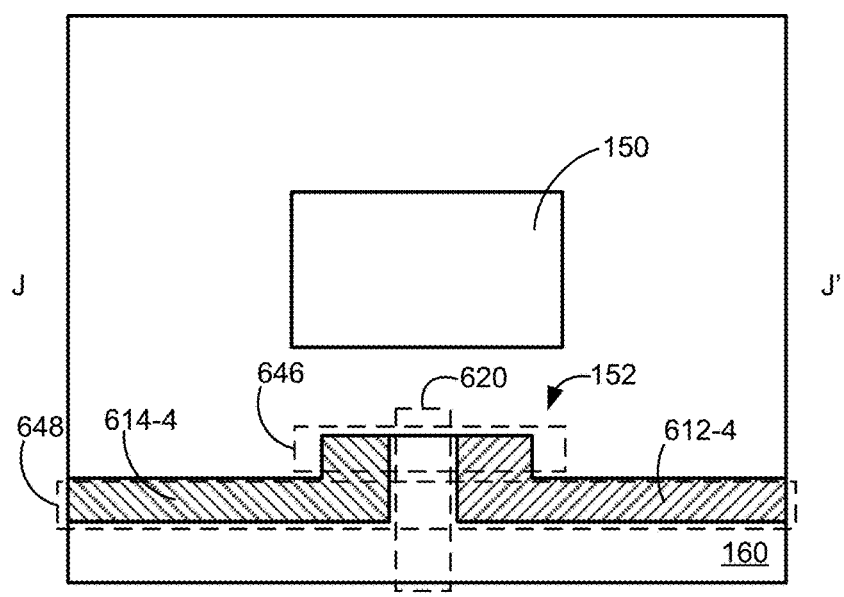
FIG. 7B is a cross-sectional view of the coupling region shown in FIG. 7A.

Line JJ' represents a view from which the cross-section shown in FIG. 7B is taken. FIG. 7B is similar to FIG. 6B except that the region 614-4 and the region 612-2 are separated by the region 620.

Although various lines and vias for providing a voltage between a region 614 doped with the dopants of the first type and a region 612 doped with the dopants of the second type are not shown in FIGS. 7A and 7B, a person having ordinary skill in the art would understand that the lines (e.g., lines 630, 632, 634, and 636) and vias 606 shown in FIGS. 6E and 6F may be used to provide a voltage between the region 614 and the region 612. For brevity, such details are not repeated herein.

Although FIGS. 5A-5B, 6A-6F, and 7A-7B illustrate that the second waveguide 152 as a planar ribbed waveguide, in some implementations, the second waveguide 152 is a vertical ribbed waveguide. Alternatively, the second waveguide 152 may be a strip waveguide.

Figure 8A:
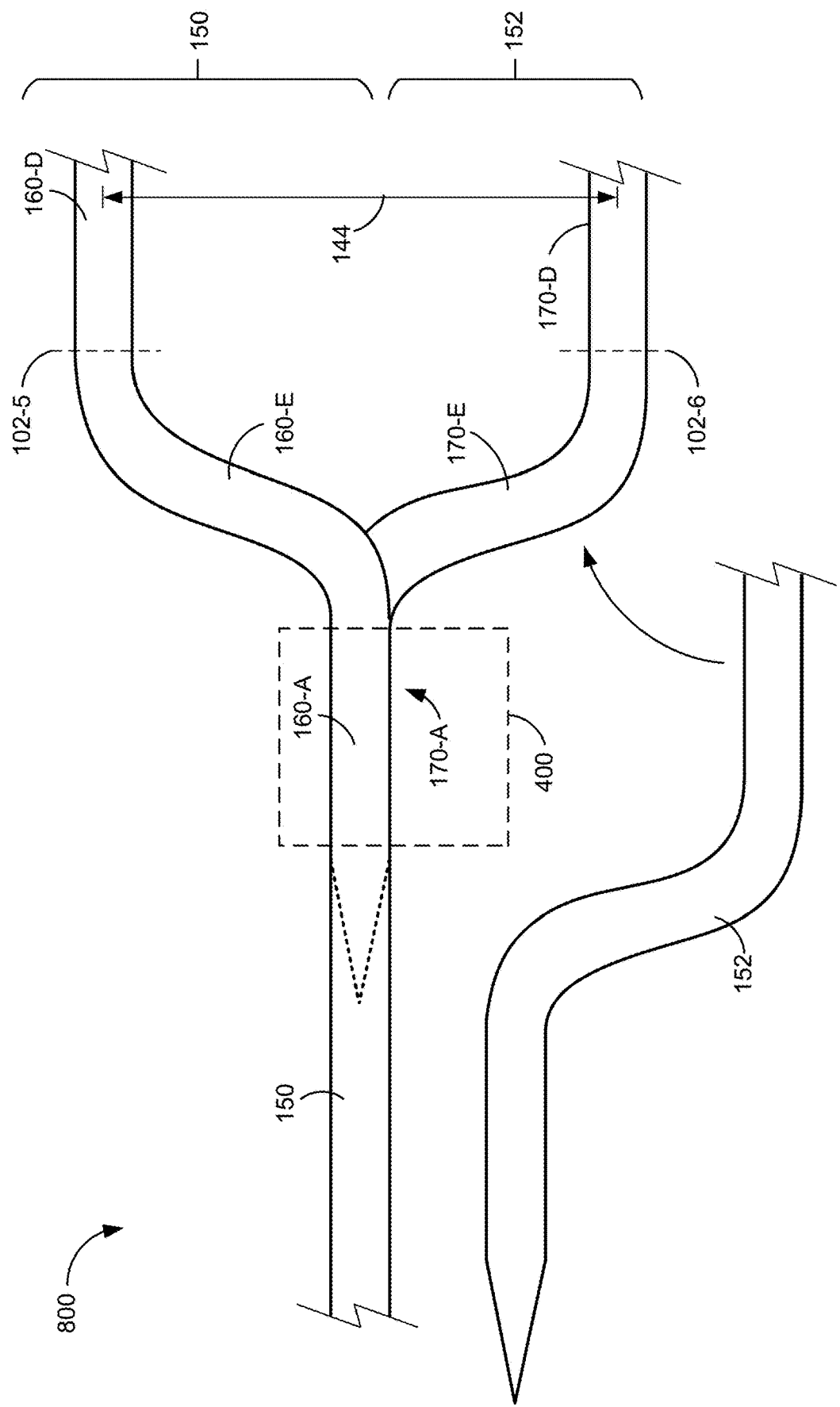
FIGS. 8A and 8B illustrate optical switch devices in accordance with some embodiments, in which a number of input ports is different from a number of output ports.
Figure 8B:
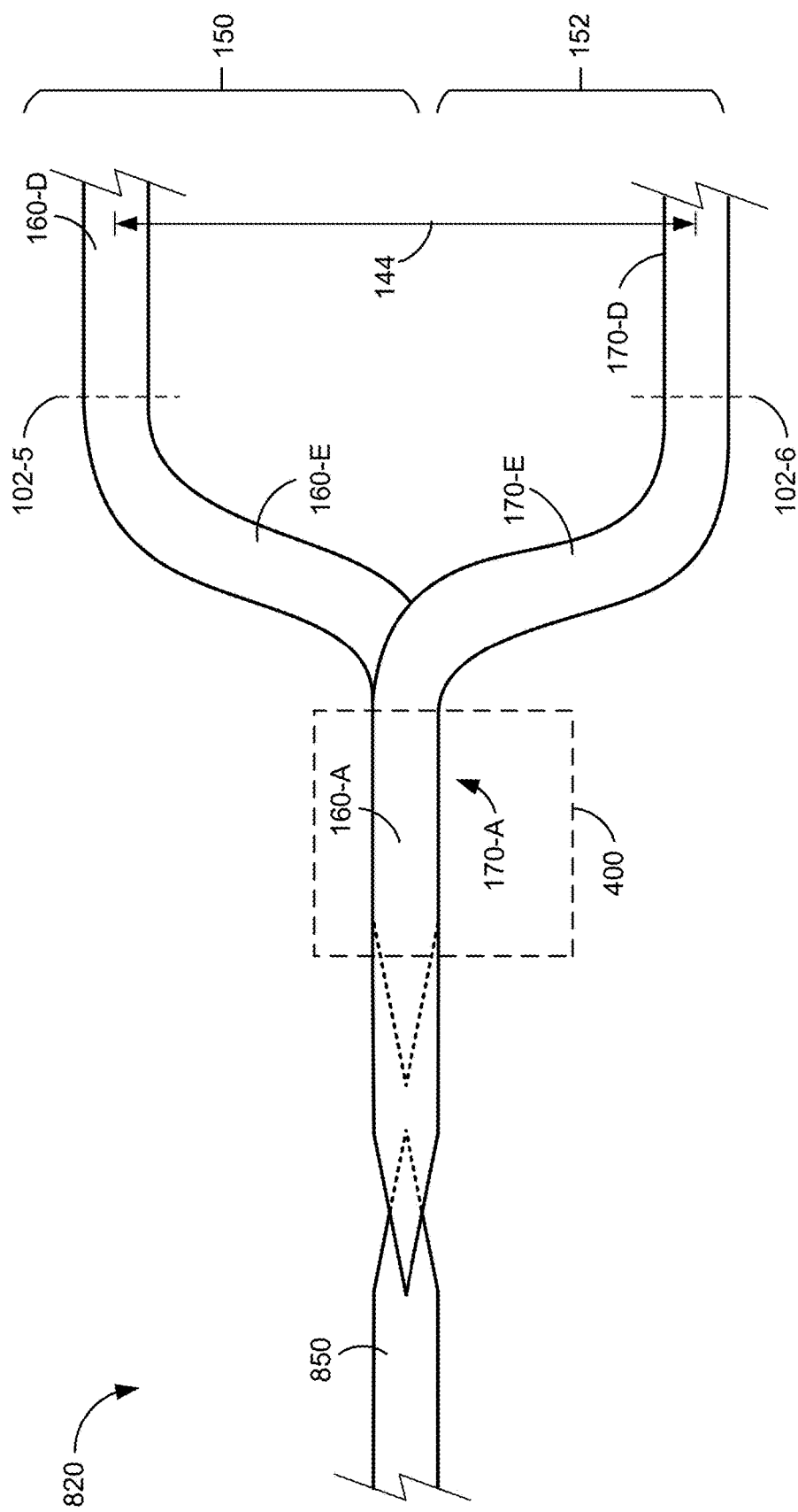

FIGS. 8A and 8B illustrate optical switch devices in accordance with some embodiments, in which a number of input ports is different from a number of output ports.

The optical switch device 800 shown in FIG. 8A is similar to the optical switch device 300 shown in FIG. 3A. However, the optical switch device 800 differs from the optical switch device 300 at least in that the second waveguide 152 is not directly coupled to an input port of the optical switch device 800. Instead, one end of the second waveguide 152 in FIG. 8A is located adjacent to the coupling region 400 so that the second waveguide 152 is configured to conditionally receive light from the first waveguide 150 (based on the absorption property of a portion of the second waveguide 152 in the coupling region 400). Light injected into the first waveguide 150 propagates toward, and enters, the first portion 160-A, where the light is coupled to the portion 170-A while the absorption property of the portion 170-A is below a threshold absorption value, and subsequently, the light propagates within the second waveguide 152 from the portion 170-A through the portion 170-E toward the portion 170-D. Alternatively, the light remains within the first waveguide 150 while the absorption property of the portion 170-A is above the threshold absorption value and propagates from the portion 160-A through the portion 160-E toward the portion 160-D.

The one end of the second waveguide 152 located adjacent to the coupling region 400 may be tapered, which facilitates coupling of the light from the first waveguide 150 to the second waveguide 152 while the absorption property of the portion 170-A is below the threshold absorption value.

FIG. 8B shows an optical switch device 820 that is similar to the optical switch device 800 shown in FIG. 8A. However, in the optical switch device 820, neither the first waveguide 150 nor the second waveguide 152 is directly coupled to an input port of the optical switch device 820. Instead, the optical switch device 820 includes a waveguide 850 that is optically coupled to the second waveguide 152 so that light propagating within the waveguide 850 is coupled to the second waveguide 152. One end of the first waveguide 150 in FIG. 8B is located adjacent to the coupling region 400 so that the first waveguide 150 is configured to conditionally receive light from the second waveguide 152 (based on the absorption property of a portion of the first waveguide 150 in the coupling region 400). Light coupled into the second waveguide 152 from the waveguide 850 propagates toward, and enters, the first portion 170-A, where the light is coupled to the portion 160-A while the absorption property of the portion 160-A is below a threshold absorption value, and subsequently, the light propagates within the first waveguide 150 from the portion 160-A through the portion 160-E toward the portion 160-D. Alternatively, the light remains within the second waveguide 152 while the absorption property of the portion 160-A is above the threshold absorption value and propagates from the portion 170-A through the portion 170-E toward the portion 170-D.

FIG. 8B also shows that the second waveguide 152 is located above the first waveguide 150. However, a person having ordinary skill in the art would understand that the second waveguide 152 may be located below the first waveguide 150 as shown in FIG. 8A. For brevity, such details are not repeated herein.

The optical switch devices 800 and 820 are 1×2 optical switch devices (each having one input port and two output ports), unlike the optical switch device 300, which is a 2×2 optical switch device (having two input ports and two output ports). A person having ordinary skill in the art would understand that an optical switch device with a different number of input ports and/or a different number of output ports may be made and used based on the information provided herein. For example, a cascaded optical switch device having one input port and more than two output ports may be made and operated. For brevity, such details are not repeated herein.

FIG. 9 is a flowchart illustrating method 900 of operating an optical switch device in accordance with some embodiments.

The method 900 includes (902) transmitting light into the first semiconductor structure of any optical switch device described herein while a first voltage satisfying a first voltage condition is applied between the first doped region and the second doped region for coupling the light from the first waveguide to the second waveguide. In some embodiments, the first voltage condition requires that the applied voltage is below a first voltage threshold.

In some embodiments, the method 900 also includes, prior to, or subsequent to, coupling the light from the first waveguide to the second waveguide, (904) transmitting the light into the first semiconductor structure while a second voltage satisfying a second voltage condition different from the first voltage condition is applied between the first doped region and the second doped region for propagating the light within the first waveguide without coupling the light from the first waveguide to the second waveguide. In some embodiments, the second voltage condition is that the second voltage does not satisfy the first voltage condition. Alternatively, the second voltage condition is that the applied voltage is above a second voltage threshold, which may or may not be the same as the first voltage threshold.

For example, for an optical switch device with the coupling region 200 illustrated in FIG. 2A, the first voltage condition requires that the first voltage does not provide a forward bias (e.g., the first voltage is below a forward bias voltage threshold so that the first voltage does not provides the forward bias). Thus, applying the first voltage between the first doped region and the second doped region does not cause injection of free carriers into the optical waveguide located adjacent to the first doped region and the second doped region, thereby maintaining the free carrier density low (e.g., $4 \times 10^{16}$ $cm^{-3}$ or less, for example). For such optical switch devices, the second voltage condition requires that the second voltage provides a forward bias (e.g., the second voltage is above the forward bias voltage threshold). Thus, applying the second voltage between the first doped region and the second doped region causes injection of free carriers into the optical waveguide located adjacent to the first doped region and the second doped region, thereby increasing the free carrier density (e.g., $6 \times 10^{18}$ $cm^{-3}$ or less, for example).

In another example, for an optical switch with the coupling region 400 illustrated in FIG. 6A, the first voltage condition requires that the first voltage provides a reverse bias (e.g., the first voltage is less than a reverse bias voltage threshold so that the first voltage provides the reverse bias). Thus, applying the first voltage between the first doped region and the second doped region causes formation (or an enlargement) of a depletion region between the first doped region and the second doped region, thereby reducing the free carrier density (e.g., $4 \times 10^{16}$ $cm^{-3}$ or less, for example). For such optical switch devices, the second voltage condition requires that the second voltage does not provide a reverse bias (e.g., the second voltage is above the reverse bias voltage threshold). Thus, applying the second voltage between the first doped region and the second doped region does not cause formation of the depletion region between the first doped region and the second doped region, thereby increasing the free carrier density (e.g., $6 \times 10^{18}$ $cm^{-3}$ or less, for example).

In some embodiments, the second semiconductor structure has (906) a first carrier density while the first voltage is applied between the first doped region and the second doped region, and the second semiconductor structure has a second carrier density that is greater than the first carrier density by a factor of at least 100 while the second voltage is applied between the first doped region and the second doped region.

In some embodiments, the light is coupled (908) from the first waveguide to the second waveguide while the optical switch device is at a temperature between 40 Kelvin and 200 Kelvin. The free carrier density generally decreases at lower temperatures. However, the optical switch devices described herein allow more effective changes in the absorption property value of the waveguide, and such optical switch devices can provide switching operations even at a low temperature, such as a temperature below 200 Kelvin, a temperature below 150 Kelvin, a temperature below 100 Kelvin, a temperature below 90 Kelvin, a temperature below 80 Kelvin, a temperature below 70 Kelvin, a temperature below 60 Kelvin, a temperature below 50 Kelvin, a temperature below 45 Kelvin, or a temperature at 40 Kelvin. Thus, the optical switch devices described herein can be used even for optical applications requiring switching operations at cryogenic temperatures (e.g., less than 93 Kelvin).

In some embodiments, applying the second voltage between the first doped region and the second doped region while the optical switch device is at a temperature less than 40 Kelvin foregoes switching the optical switch device between the "on" state and the "off" state. For example, in some embodiments, applying the second voltage between the first doped region and the second doped region while the optical switch device is at a temperature less than 40 Kelvin allows (910) coupling of the light from the first waveguide to the second waveguide. As explained above, the free carrier density decreases at low temperatures. At a temperature less than 40 Kelvin for example, the free carrier density will decrease significantly so that applying the second voltage may not provide sufficient increase in the free carrier density, thereby interfering with the switching operations of the optical switch device. In some embodiments, applying the second voltage between the first doped region and the second doped region while the optical switch device is at a temperature less than 35 Kelvin, 30 Kelvin, 25 Kelvin, or 20 Kelvin foregoes transitioning the optical switch device between the "on" state and the "off" state.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. For example, although FIGS. 6A-6F illustrate the optical switch device in which two optical waveguides have different widths, a person having ordinary skill in the art would understand that the two optical waveguides can have a same width in a manner analogous to the optical waveguides shown in FIG. 4B. The embodiments were chosen in order to best explain the principles underlying the claims and their practical applications, to thereby enable others skilled in the art to best use the embodiments with various modifications as are suited to the particular uses contemplated.

APPENDIX TO THE SPECIFICATION

Some embodiments can be described with reference to the following clauses:

Clause 1. An optical switch device, comprising:
a first semiconductor structure configured to operate as a first waveguide; and
a second semiconductor structure configured to operate as a second waveguide, the second semiconductor structure being located above or below the first semiconductor structure and separated from the first semiconductor structure, the second semiconductor structure including a first portion having a first width and a second portion having a width different from the first width and located on the first portion, the first portion being located between a first doped region and a second doped region.

Clause 2. The optical switch device of clause 1, wherein:
the first semiconductor structure and the second semiconductor structure are configured to couple light propagating in the first waveguide to the second waveguide while a first voltage satisfying a first voltage condition is applied between the first doped region and the second doped region; and
the first semiconductor structure and the second semiconductor structure are configured to forego coupling of the light propagating in the first waveguide to the second waveguide while a second voltage satisfying a second voltage condition different from the first voltage condition is applied between the first doped region and the second doped region.

Clause 3. The optical switch device of clause 2, wherein:
the second semiconductor structure has a first carrier density while the first voltage is applied between the first doped region and the second doped region; and
the second semiconductor structure has a second carrier density that is greater than the first carrier density by a factor of at least 100 while the second voltage is applied between the first doped region and the second doped region.

Clause 4. The optical switch device of clause 2 or 3, wherein:
the first portion has a first absorption property while the first voltage is applied between the first doped region and the second doped region and a second absorption property that is different from the first absorption property while the second voltage is applied between the first doped region and the second doped region.

Clause 5. The optical switch device of any of clauses 1-4, wherein:
the second portion includes a plurality of first sections having a second width interleaved by a plurality of second sections having a third width different from the second width.

Clause 6. The optical switch device of any of clauses 1-4, wherein:
the second portion includes a plurality of first sections having a first thickness interleaved by a plurality of second sections having a second thickness different from the first thickness.

Clause 7. The optical switch device of clause 5 or 6, wherein:
each first section of the plurality of first sections has a first length; and
each second section of the plurality of second sections has a second length that is different from the first length.

Clause 8. The optical switch device of any of clauses 1-7, wherein:
the first semiconductor structure is made of a first semiconductor material having a first index of refraction; and
the second semiconductor structure is made of a second semiconductor material having a second index of refraction that is different from the first index of refraction.

Clause 9. The optical switch device of any of clauses 1-8, wherein:
the first doped region is doped with donor dopants; and
the second doped region is doped with acceptor dopants.

Clause 10. The optical switch device of any of clauses 1-9, wherein:
one of the first waveguide and the second waveguide is connected to an input port of the optical switch device for receiving light;
the first waveguide is connected to a first output port of the optical switch device; and
the second waveguide is connected to a second output port of the optical switch device that is different from the first output port of the optical switch device.

Clause 11. A method, comprising:
transmitting light into the first semiconductor structure of the optical switch device of clause 1 while a first voltage satisfying a first voltage condition is applied between the first doped region and the second doped region for coupling the light from the first waveguide to the second waveguide.

Clause 12. The method of clause 11, further comprising:
prior to, or subsequent to, coupling the light from the first waveguide to the second waveguide, transmitting the light into the first semiconductor structure while a second voltage satisfying a second voltage condition different from the first voltage condition is applied between the first doped region and the second doped region for propagating the light within the first waveguide without coupling the light from the first waveguide to the second waveguide.

Clause 13. The method of clause 12, wherein:
the second semiconductor structure has a first carrier density while the first voltage is applied between the first doped region and the second doped region; and
the second semiconductor structure has a second carrier density that is greater than the first carrier density by a factor of at least 100 while the second voltage is applied between the first doped region and the second doped region.

Clause 14. An optical switch device, comprising:
a first semiconductor structure configured to operate as a first waveguide; and
a second semiconductor structure configured to operate as a second waveguide, the second semiconductor structure being located above or below the first semiconductor structure and separated from the first semiconductor structure, wherein the second semiconductor structure includes a portion of a first doped region doped with dopants of a first type and a portion of a second doped region doped with dopants of a second type that is different from the dopants of the first type.

Clause 15. The optical switch device of clause 14, wherein:
the second semiconductor structure includes a plurality of first-cross-section regions interleaved by a plurality of second-cross-section regions along the direction of the second waveguide.

Clause 16. The optical switch device of clause 15, wherein:
each first-cross-section region of the plurality of first-cross-section regions has a first width; and
each second-cross-section region of the plurality of second-cross-section regions has a second width that is different from the first width.

Clause 17. The optical switch device of clause 15 or 16, wherein:
each first-cross-section region of the plurality of first-cross-section regions has a first thickness; and
each second-cross-section region of the plurality of second-cross-section regions has a second thickness that is different from the first thickness.

Clause 18. The optical switch device of any of clauses 15-17, wherein:
the plurality of first-cross-section regions includes first, second, and third regions and the plurality of second-cross-section regions includes fourth and fifth regions, the first, second, and third regions being interleaved by the fourth and fifth regions so that the fourth region is located between the first and second regions and the fifth region is located between the second and third regions;
the optical switch device also includes:
  a plurality of regions doped with the dopants of the first type, including the first doped region and a third doped region, and
  a plurality of regions doped with the dopants of the second type, including the second doped region and a fourth doped region;
the first doped region and the second doped region include the first, fourth, and second regions; and
the third doped region and the fourth doped region include the second, fifth, and third regions.

Clause 19. The optical switch device of clause 18, wherein:
the plurality of first-cross-section regions includes a sixth region and the plurality of second-cross-section regions includes a seventh region, the seventh region being located between the third region and the sixth region;
the plurality of regions doped with dopants of the first type also includes a fifth doped region and the plurality of regions doped with dopants of the second type also includes a sixth doped region;
the fifth doped region and the sixth doped region include the third, seventh, and sixth regions; and
the fourth doped region is located between the first and fifth doped regions, and the third doped region is located between the second and sixth doped regions.

Clause 20. The optical switch device of any of clauses 18-19, wherein:
the first doped region is in contact with the second doped region; and
the third doped region is in contact with the fourth doped region.

Clause 21. The optical switch device of any of clauses 18-20, wherein:
the third doped region is separated from the first doped region and the second doped region; and the fourth doped region is separated from the first doped region and the second doped region.

Clause 22. The optical switch device of any of clauses 14-21, wherein:
the first semiconductor structure is made of a first semiconductor material having a first index of refraction; and
the second semiconductor structure is made of a second semiconductor material having a second index of refraction that is different from the first index of refraction.

Clause 23. A method, comprising:
transmitting light into the first semiconductor structure of the optical switch device of clause 14 while a first voltage satisfying a first voltage condition is applied between the first doped region and the second doped region for coupling the light from the first waveguide to the second waveguide.

Clause 24. The method of clause 23, further comprising:
prior to, or subsequent to, coupling the light from the first waveguide to the second waveguide, transmitting the light into the first semiconductor structure while a second voltage satisfying a second voltage condition different from the first voltage condition is applied between the first doped region and the second doped region for propagating the light within the first waveguide without coupling the light from the first waveguide to the second waveguide.

Clause 25. The method of clause 24, wherein:
the second semiconductor structure has a first carrier density while the first voltage is applied between the first doped region and the second doped region; and
the second semiconductor structure has a second carrier density that is greater than the first carrier density by a factor of at least 100 while the second voltage is applied between the first doped region and the second doped region.

Clause 26. The method of clause 24 or 25, wherein:
the light is coupled from the first waveguide to the second waveguide while the optical switch device is at a temperature between 40 Kelvin and 200 Kelvin.

Clause 27. The method of clause 24, wherein:
applying the second voltage between the first doped region and the second doped region while the optical switch device is at a temperature less than 40 Kelvin allows coupling of the light from the first waveguide to the second waveguide.

Clause 28. An optical switch device, comprising:
a first waveguide including a first portion coupled with a first region doped with first dopants and a second portion coupled with a second region doped with second dopants; and
a second waveguide located adjacent to the first waveguide for coupling light from the first waveguide to the second waveguide, the second waveguide including a third portion coupled with a third region doped with first dopants and a fourth portion coupled with a fourth region doped with second dopants, wherein the first portion is located adjacent to the third portion and the second portion is located adjacent to the fourth portion.

Clause 29. The optical switch device of clause 28, wherein:
the first waveguide includes a plurality of first portions coupled with regions doped with the first dopants and a plurality of second portions coupled with regions doped with the second dopants, the plurality of first portions being interleaved with the plurality of second portions; and
the second waveguide includes a plurality of third portions coupled with regions doped with the first dopants and a plurality of fourth portions coupled with regions doped with the second dopants, the plurality of third portions being interleaved with the plurality of fourth portions.

Clause 30. The optical switch device of clause 28 or 29, wherein:
the first region and the second region are configured to receive a voltage satisfying a first voltage condition between the first region and the second region; and
the third region and the fourth region are not configured to receive a voltage satisfying the first voltage condition between the third region and the fourth region.

Clause 31. The optical switch device of any of clauses 28-30, further comprising:
a resistive heater located adjacent to the first waveguide and the second waveguide for changing a temperature of the first waveguide and the second waveguide.

What is claimed is:

1. An optical switch device, comprising:
a switching region with an input, a first output, and a second output;
a first waveguide that is coupled to the input to receive light and coupled to the first output to output light that is in the first waveguide;
a second waveguide that is adjacent to the first waveguide in a coupling region, the second waveguide coupled to the second output to output light that is coupled to the second waveguide, the light being coupled to the first output and second output based on configurable absorption values of the second waveguide in the coupling region being below a threshold level, the light being coupled to only the first output based on increased absorption values of the second waveguide in the coupling region, the increased absorption values being above the threshold level, wherein:
a first end of the second waveguide is located adjacent to the coupling region, and
the first end is tapered.

2. The optical switch device of claim 1, wherein the first waveguide includes a first set of regions doped with first dopants.

3. The optical switch device of claim 2, wherein the first waveguide includes a second set of regions doped with second dopants.

4. The optical switch device of claim 2, wherein the second waveguide includes a third set of regions doped with the first dopants, and wherein at least a subset of the third set of regions is positioned adjacent to at least a subset of the first set of regions.

5. The optical switch device of claim 1, further comprising a voltage source configured to apply a voltage to at least a portion of the second waveguide, the voltage configured to adjust the absorption values of the second waveguide.

6. The optical switch device of claim 1, further comprising a heat source configured to supply heat to at least one of the first waveguide and the second waveguide so as to adjust a coupling ratio between the first waveguide and the second waveguide.

7. The optical switch device of claim 1, wherein the first waveguide is composed of a different material than the second waveguide.

8. The optical switch device of claim 7, wherein the first waveguide or the second waveguide is composed of silicon nitride.

9. The optical switch device of claim 1, wherein at least one of the first waveguide and the second waveguide is a multi-mode waveguide.

10. The optical switch device of claim 1, wherein the first waveguide is vertically stacked with the second waveguide in the coupling region.

11. The optical switch device of claim 1, wherein the optical switch device is a 1×2 optical switch.

* * * * *